(12) United States Patent
Yamada et al.

(10) Patent No.: US 12,131,526 B2
(45) Date of Patent: Oct. 29, 2024

(54) SYSTEMS AND METHODS FOR SEGMENTING ROCK PARTICLE INSTANCES

(71) Applicant: Schlumberger Technology Corporation, Sugar Land, TX (US)

(72) Inventors: Tetsushi Yamada, Cambridge, MA (US); Simone Di Santo, Dhahran (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 463 days.

(21) Appl. No.: 17/647,407

(22) Filed: Jan. 7, 2022

(65) Prior Publication Data

US 2023/0220761 A1 Jul. 13, 2023

(51) Int. Cl.
*G06V 10/82* (2022.01)
*E21B 44/00* (2006.01)
(Continued)

(52) U.S. Cl.
CPC .............. *G06V 10/82* (2022.01); *E21B 44/00* (2013.01); *G06N 3/08* (2013.01); *G06T 7/0004* (2013.01);
(Continued)

(58) Field of Classification Search
CPC .. G06V 10/82; G06V 10/7715; G06V 10/774; G06V 20/10; G06V 10/454;
(Continued)

(56) References Cited

U.S. PATENT DOCUMENTS

| 1,179,089 A | 4/1916 | Gibson |
|---|---|---|
| 7,936,374 B2 | 5/2011 | Cutler |
| (Continued) | | |

FOREIGN PATENT DOCUMENTS

| CN | 111141698 A | 5/2020 |
|---|---|---|
| EP | 3896496 A1 | 10/2021 |
| (Continued) | | |

OTHER PUBLICATIONS

International Preliminary Report on Patentability issued in the PCT Application No. PCT/US2021/044883 dated Feb. 16, 2023, 7 pages.
(Continued)

*Primary Examiner* — Edward F Urban
*Assistant Examiner* — Wassim Mahrouka
(74) *Attorney, Agent, or Firm* — Jeffrey D. Frantz

(57) ABSTRACT

Systems and methods presented herein are configured to train a neural network model using a first set of photographs, wherein each photograph of the first set of photographs depicts a first set of objects and include one or more annotations relating to each object of the first set of objects; to automatically create mask images corresponding to a second set of objects depicted by a second set of photographs; to enable manual fine tuning of the mask images; to re-train the neural network model using the second set of photographs, wherein the re-training is based at least in part on the manual fine tuning of the mask images; and to identify one or more individual objects in a third set of photographs using the re-trained neural network model.

18 Claims, 14 Drawing Sheets

(51) Int. Cl.
| | |
|---|---|
| *G01N 15/1433* | (2024.01) |
| *G06N 3/08* | (2023.01) |
| *G06T 7/00* | (2017.01) |
| *G06T 7/73* | (2017.01) |
| *G06V 10/77* | (2022.01) |
| *G06V 10/774* | (2022.01) |
| *G06V 20/10* | (2022.01) |

(52) U.S. Cl.
CPC ............ *G06T 7/74* (2017.01); *G06V 10/7715* (2022.01); *G06V 10/774* (2022.01); *G06V 20/10* (2022.01); *E21B 2200/22* (2020.05); *G01N 15/1433* (2024.01); *G06T 2207/20081* (2013.01); *G06T 2207/20084* (2013.01); *G06T 2207/30181* (2013.01)

(58) Field of Classification Search
CPC .... E21B 44/00; E21B 2200/22; E21B 49/005; G06N 3/08; G06N 3/045; G06T 7/0004; G06T 7/74; G06T 2207/20081; G06T 2207/20084; G06T 2207/30181; G01N 15/1433
See application file for complete search history.

(56) References Cited

U.S. PATENT DOCUMENTS

| | | | |
|---|---|---|---|
| 9,412,023 | B1 | 8/2016 | Hurley |
| 9,507,047 | B1 | 11/2016 | Dvorkin |
| 9,652,684 | B2 | 5/2017 | Keskes et al. |
| 10,927,671 | B1 | 2/2021 | Tonner et al. |
| 11,188,794 | B2 | 11/2021 | Yao et al. |
| 2005/0276513 | A1 | 12/2005 | Ojanen |
| 2010/0128932 | A1 | 5/2010 | Dvorkin |
| 2012/0123756 | A1* | 5/2012 | Wang ............ E21B 44/00 703/2 |
| 2013/0073207 | A1 | 3/2013 | Ganz |
| 2013/0120763 | A1 | 5/2013 | Grenet |
| 2013/0259190 | A1 | 10/2013 | Walls |
| 2014/0046628 | A1 | 2/2014 | Ligneul et al. |
| 2015/0043787 | A1 | 2/2015 | Fredrich |
| 2016/0370274 | A1 | 12/2016 | Rowe et al. |
| 2017/0085860 | A1 | 3/2017 | Zhang |
| 2018/0101962 | A1 | 4/2018 | Takizawa |
| 2018/0180524 | A1 | 6/2018 | Francois et al. |
| 2019/0212272 | A1 | 7/2019 | Scoullar |
| 2019/0338637 | A1 | 11/2019 | Francois et al. |
| 2020/0025667 | A1 | 1/2020 | Allo |
| 2020/0143205 | A1* | 5/2020 | Yao ............ G06V 10/82 |
| 2020/0150307 | A1 | 5/2020 | Myers |
| 2020/0157929 | A1 | 5/2020 | Torrione |
| 2021/0041588 | A1 | 2/2021 | Chen |
| 2021/0254457 | A1 | 8/2021 | Anifowose |
| 2021/0312674 | A1 | 10/2021 | Abrol et al. |
| 2021/0319257 | A1 | 10/2021 | Francois et al. |
| 2023/0184992 | A1 | 6/2023 | AlBahrani |
| 2023/0220770 | A1 | 7/2023 | Yamada |
| 2023/0351580 | A1 | 11/2023 | Di Santo |
| 2024/0054766 | A1 | 2/2024 | Yu |

FOREIGN PATENT DOCUMENTS

| | | |
|---|---|---|
| WO | 2019167030 A1 | 9/2019 |
| WO | 2022032057 A1 | 2/2022 |

OTHER PUBLICATIONS

Using colorcheck. Imatest, Retrieved Mar. 4, 2022, from https://www.imatest.com/docs/colorcheck/, 26 pages.

Sharpness: What is it and how it is measured. Imatest, Retrieved Mar. 4, 2022, from https://www.imatest.com/docs/sharpness/, 17 pages.

Beard et al., Influence of texture on porosity and permeability of unconsolidated sand. American Association of Petroleum Geologists Bulletin, vol. 27, No. 2, Feb. 1973, p. 349-369.

Ameen et al., The function of fractures and in-situ stresses in the Khuff reservoir performance, onshore fields, Saudi Arabia, American Association of Petroleum Geologists Bulletin, vol. 94, No. 1, Jan. 2010, pp. 27-60.

Blaschke et al., Object-Based Image Analysis. Springer. p. 37. ISBN: 978-3-540-77057-2, 2008, 30 pages.

Abbireddy, C.O.R. et al., "A method of estimating the form of fine particulates", Geotechnique, 2009, 59(6), pp. 503-511.

Barrett, P. J. "The shape of rock particles, a critical review", Sedimentology, 1980, 27, pp. 291-303.

Caicedo, J. C. et al., "Nucleus segmentation across imaging experiments: the 2018 Data Science Bowl", Nature Methods, 2019, 16, pp. 1247-1253.

Dunlop, H. et al., "Multi-scale Features for Detection and Segmentation of Rocks in Mars Images", 2007, 10.1109/CVPR.2007.383257, 7 pages.

Feng, L. et al., "Robust Nucleus Detection with Partially Labeled Exemplars", IEEE Access (7), 2019, pp. 162169-162178.

Gaetano, R. et al., "Hierarchical Texture-Based Segmentation of Multiresolution Remote-Sensing Images", IEEE Transactions on Geoscience and Remote Sensing, 2009, 47(7), pp. 2129-2141.

He, K. et al., "Mask R-CNN", Computer Vision (ICCV), IEEE International Conference on Computer Vision, 2017, pp. 2980-2988.

He, K. et al., "Deep Residual Learning for Image Recognition", 2016 IEEE International Conference on Computer Vision, 2016, pp. 770-778.

Huo, F. et al., "Novel lithology identification method for drilling cuttings under PDC bit condition", Journal of Petroleum Science and Engineering, 2021, 205, 15 pages.

Jung, H. et al., "An automatic nuclei segmentation method based on deep convolutional neural networks for histopathology images", BMC Biomedical Engineering, 2019, 1:24, 12 pages.

Lin, T. Y. et al., "Microsoft COCO: Common Objects in Context", ECCV 2014: Computer Vision—ECCV 2014, pp. 740-755.

Lin, T.-Y. et al., "Feature Pyramid Networks for Object Detection", Computer Vision and Pattern Recognition (CVPR), IEEE International Conference on Computer Vision 2017, pp. 936-944.

Rahmani, H. et al., "Automated segmentation of gravel particles from depth images of gravel-soil mixtures", Compute and Geosciences, 2019, 128, pp. 1-10.

Ravali, K. et al., "Graph—Based High Resolution Satellite Image Segmentation for Object Recognition", The International Archives of the Photogrammetry, Remote Sensing and Spatial Information Sciences, 2014, vol. XL-8, pp. 913-917.

Sanxo—Scope HD U4 Express: Industrial Microscope downloaded from the internt at [https://sanxo.eu/sanxo-scope-hd-u4-express-industrial-microscope/] on Apr. 21, 2022, 8 pages.

Shi, J. et al., "Normalized Cuts and Image Segmentation", IEEE Transactions on Pattern Analysis and Machine Intelligence, 2000, 22(8), pp. 888-905.

Thurley, M. J., "Automated Image Segmentation and Analysis of Rock Piles in an Open-Pit Mine", International Conference on Digital Image Computing: Techniques and Applications (DICTA), 2013, 10.1109/DICTA.2013.6691484, 8 Pages.

Ting, G. et al., "Rock Particle Image Segmentation Based on Improved Normalized Cut", International Journal of Control and Automation, 2017, 10(4), pp. 271-286.

Wang, W., "Rock Particle Image Segmentation and Systems", in Pattern Recognition Techniques, Technology and Applications, Book edited by: Peng-Yeng Yin, Nov. 2008, I-Tech, Vienna, Austria, 10.5772/6242, 30 pages.

Wikipedia "Semi Supervised Learning" downloaded from the internet at [https://en.wikipedia.org/wiki/Semi-supervised_learning] retrieved on Apr. 21, 2022, 7 pages.

Wikipedia "Transfer Learning" downloaded from the internet at [https://en.wikipedia.org/wiki/Transfer_learning] retrieved on Apr. 21, 2022, 5 pages.

(56) References Cited

OTHER PUBLICATIONS

Wikipedia "Run-length encoding", downloaded from the internet at [https://en.wikipedia.org/wiki/Run-length_encoding] retrieved on Apr. 21, 2022, 3 pages.
"pytorch/vision" downloaded from the internet at [https://github.com/pytorch/vision] retrieved on Apr. 21, 2022, 6 pages.
"Mongoose Pro Dynamic dual-motion shaker", retrieved from the internet: [https://www.slb.com/drilling/drilling-fluids-and-well-cementing/solids-control/shale-shakers/mongoose-pro-shale-shaker] Apr. 19, 2022, 9 pages.
Search Report and Written Opinion of International Patent Application No. PCT/US2021/044883 dated Nov. 16, 2021, 10 pages.
International Search Report and Written Opinion issued in PCT Application No. PCT/US2022/053454 dated Apr. 25, 2023, 10 pages.
International Search Report and Written Opinion issued in PCT Application No. PCT/US2022/060240 dated Apr. 28, 2023, 10 pages.
Liang, Z. et al., "A particle shape extraction and evaluation method using a deep convolutional neural network and digital image processing", Powder Technology, 2019, 353, pp. 156-170.
International Search Report and Written Opinion issued in PCT Application No. PCT/US2023/015998 dated Jul. 23, 2023, 11 pages.
International Search Report and Written Opinion issued in PCT Application No. PCT/US2023/070658 dated Nov. 8, 2023, 12 pages.
International Preliminary Report on Patentability issued in International Patent application PCT/US2023/060240, dated Jan. 6, 2023, 6 pages.
International Preliminary Report on Patentability issued in International Patent application PCT/US2022/053454, dated Jun. 20, 2024, 6 pages.
Office Action issued in U.S. Appl. No. 17/647,412 dated Jul. 18, 2024, 10 pages.

* cited by examiner

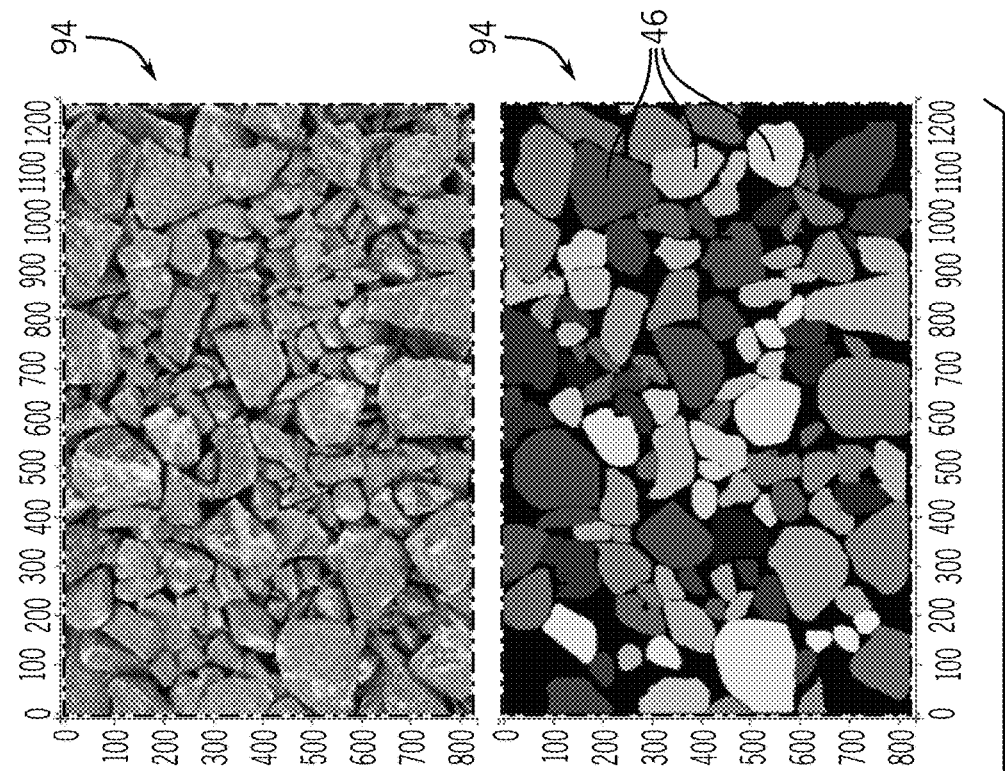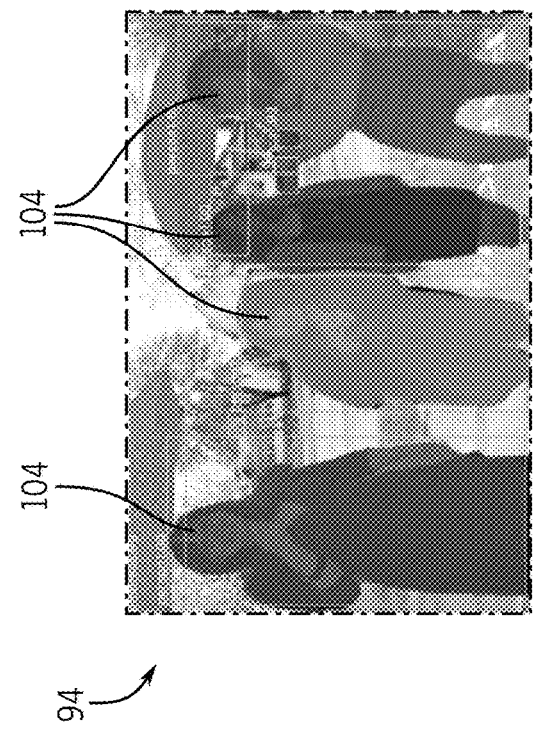
FIG. 6

SYSTEMS AND METHODS FOR SEGMENTING ROCK PARTICLE INSTANCES

BACKGROUND

The present disclosure generally relates to systems and methods for automatically segmenting individual instances of rock particles from a well from digital photographs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Automatically detecting rock particles has wide industry and scientific applications including, but not limited to, space exploration, mining, civil engineering, geothermal, and oil and gas. Many research projects have been conducted for such task for several decades. The data typically comes from imaging systems that produce digital photos or three-dimensional (3D) images from a laser scanner. Rock particles are usually a fundamental unit of domain-specific post-processing analysis. Once particles are detected and segmented, they can be used to compute the properties of particles such as size, shapes, textures, and categories based on those properties to answer domain-specific questions.

In oil and gas, geothermal, as well as scientific exploration applications, rock particles are naturally produced during drilling activities. Those particles are called rock cuttings and are one of the highest available and lowest cost data sources for understanding and characterizing the subsurface rock properties. As such, there is a strong industry need to automatically analyze rock cuttings to reduce human cost and shorten the turnaround time of the interpretation.

However, particle segmentation is not a simple task for multiple reasons. For example, it is the most important and hardest part of pattern recognition for rock particles. Rock particles usually have varying morphologies, texture, and colors. When the scene is captured by a sensor in an imaging system, artefacts, such as shadow and light reflection on the surface of the particle, may be introduced in the image. Furthermore, when the particles are piled on or touching each other, the segmentation becomes even more difficult. In such cases, the limits of particles can be very subtle even for a human's eye, depending on type of rock and other factors such as lighting conditions. However, facing such situations is almost inevitable in most industry applications. In addition, separating particles before capturing the scene often introduces additional human interventions, which is not desirable.

In the past, a variety of segmentation methods have been explored such as the watershed transform and normalized cuts. The watershed transform is especially popular for its simplicity, efficiency, and availability of the computation library such as OpenCV. It is often proceeded by morphological operations and followed by refinements. However, the result is highly dependent on the hyper-parameters, and it often suffers from under-segmentation or over-segmentation. In addition, it is generally not easy to design the pre-processing parts so that the segmentation works when the sizes of the objects are not uniform. Despite these prior efforts, automatic segmentation has been far from accurate.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes training, via an analysis and control system, a neural network model using a first set of photographs. Each photograph of the first set of photographs depicts a first set of objects and include one or more annotations relating to each object of the first set of objects. The method also includes automatically creating, via the analysis and control system, mask images corresponding to a second set of objects depicted by a second set of photographs. The method further includes enabling, via the analysis and control system, manual fine tuning of the mask images corresponding to the second set of objects depicted by the second set of photographs. In addition, the method includes re-training, via the analysis and control system, the neural network model using the second set of photographs. The re-training is based at least in part on the manual fine tuning of the mask images corresponding to the second set of objects depicted by the second set of photographs. The method also includes identifying, via the analysis and control system, one or more individual objects in a third set of photographs using the re-trained neural network model.

Certain embodiments of the present disclosure also include an analysis and control system that is configured to train a neural network model using a first set of photographs. Each photograph of the first set of photographs depicts a first set of objects and include one or more annotations relating to each object of the first set of objects. The analysis and control system is also configured to automatically create mask images corresponding to a second set of objects depicted by a second set of photographs. The analysis and control system is further configured to enable manual fine tuning of the mask images corresponding to the second set of objects depicted by the second set of photographs. In addition, the analysis and control system is configured to re-train the neural network model using the second set of photographs. The re-training is based at least in part on the manual fine tuning of the mask images corresponding to the second set of objects depicted by the second set of photographs. The analysis and control system is also configured to identify one or more individual objects in a third set of photographs using the re-trained neural network model.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 6 illustrates photos having objects from differing domains, in accordance with embodiments of the present disclosure;

DETAILED DESCRIPTION

Figure 1:
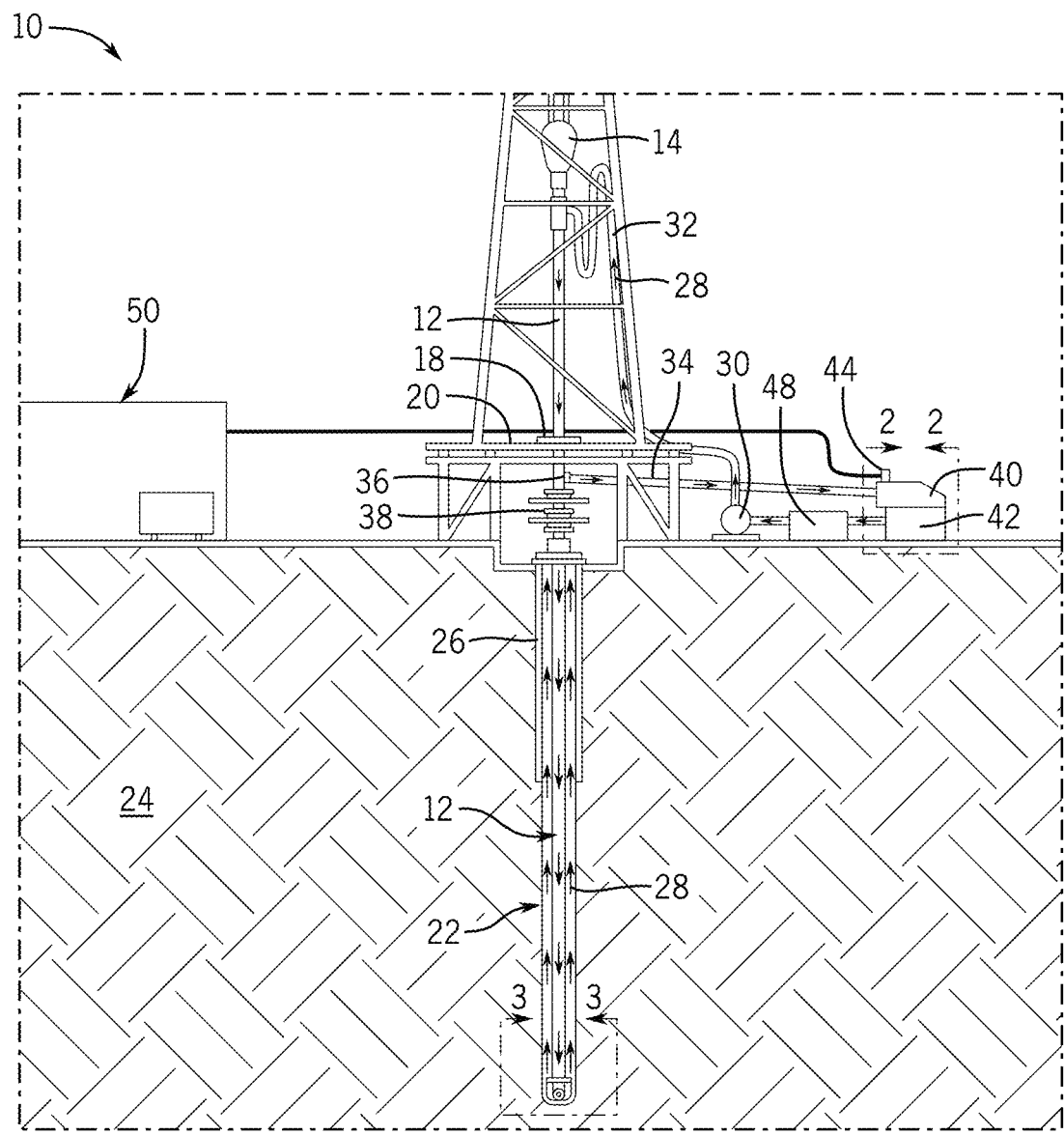
FIG. 1 illustrates a drilling operation, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

In addition, as used herein, the terms "image", "digital image", "photograph", and "photo" are intended to be used interchangeably. In addition, although described herein as systems and methods for analyzing photos of drill bit cuttings, it will be appreciated that the embodiments described herein may be capable of analyzing photos of other types of rock particles, such as other types of cuttings, cavings, and so forth.

As described above, whenever a drilling process is involved in an activity, rock cuttings are produced and are always available at the wellsite. Currently, cuttings are generally under-utilized for the subsurface characterization by geoscientists and reservoir engineers in the oil and gas industry. When these rock cuttings are observed and interpreted by human eyes, it is extremely interpreter-dependent and relatively time consuming as well as physically labor intensive. To fill this gap, there is a strong industry interest in automating the process of cuttings analysis in the industry. To that end, the embodiments described herein provide a domain-based image analysis workflow that includes multiple computational modules to automatically extract relevant geological information from rock cuttings.

To overcome the inherent limitations of the conventional segmentation methods described above, the embodiments described herein are configured to automatically segment instances of rock particles from a well from digital photos. For example, in certain embodiments, the model architecture described herein generally utilize Mask R-CNN (Region-based Convolutional Neural Networks), which has been found to outperform such conventional segmentation methods. As will be appreciated, the labeling for instance segmentation is relatively costly to produce, and this can be a bottleneck when developing such a model. To solve this problem, a pragmatic approach was used to reduce as much human annotation effort as possible, while keeping the quality of the output both at the model training time and inference time. It has been found that the same approach can be taken to efficiently build a system to run the instance segmentation using any type of image (e.g., digital photo, distance image, etc.) and rock particle scene (e.g., cuttings, mining site, space, etc.) by training the model with relevant datasets.

As described in greater detail herein, an analysis and control system is configured to train a neural network model using a first set of photographs, wherein each photograph of the first set of photographs depicts a first set of objects and include one or more annotations relating to each object of the first set of objects; to automatically create mask images corresponding to a second set of objects depicted by a second set of photographs; to enable manual fine tuning of the mask images corresponding to the second set of objects depicted by the second set of photographs; to re-train the neural network model using the second set of photographs, wherein the re-training is based at least in part on the manual fine tuning of the mask images corresponding to the second set of objects depicted by the second set of photographs; and to identify one or more individual objects in a third set of photographs using the re-trained neural network model. In addition, in certain embodiments, the second set of photographs may be generated with sparsely aligned rock particles to facilitate automation creation of the mask images. In addition, in certain embodiments, consolidation using non maximum suppression (NMS) of instances detected from flipped version of the third set of photographs may be performed, which allows detection of more instances with higher quality (e.g., test-time data augmentation (TTA)). In certain embodiments, the second and third set of photographs may be of rock particles.

FIG. 1 illustrates a drilling operation 10 in accordance with the embodiments described herein. As illustrated, in certain embodiments, a drill string 12 may be suspended at an upper end by a kelly and a traveling block 14 and terminated at a lower end by a drill bit 16. The drill string 12 and the drill bit 16 are rotated by a rotary table 18 on a driller floor 20, thereby drilling a borehole 22 into earth formation 24, where a portion of the borehole 22 may be cased by a casing 26. As illustrated, in certain embodiments, drilling fluid or drilling "mud" 28 may be pumped by a mud pump 30 into the upper end of the hollow drill string 12 through a connecting mud line 32. From there, the drilling fluid 28 may be pumped downward through the drill string 12, exiting the drill string 12 through opening in the drill bit 16, and returning to the surface by way of an annulus formed between the wall of the borehole 22 and an outer diameter of the drill string 12. Once at the surface, the drilling fluid 28 may return through a return flow line 34, for example, via a bell nipple 36. As illustrated, in certain embodiments, a blowout preventer 38 may be used to prevent blowouts from occurring in the drilling operation 10.

Figure 3:
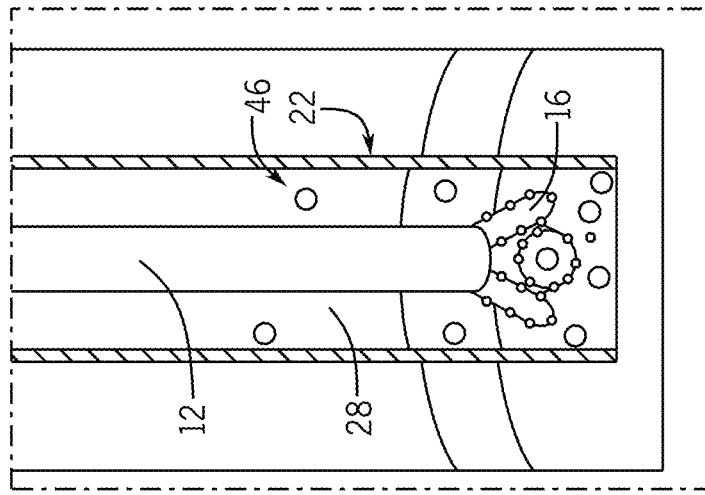
FIG. 3 illustrates how drill bit cuttings may be created by the drill bit, in accordance with embodiments of the present disclosure.
Figure 2:
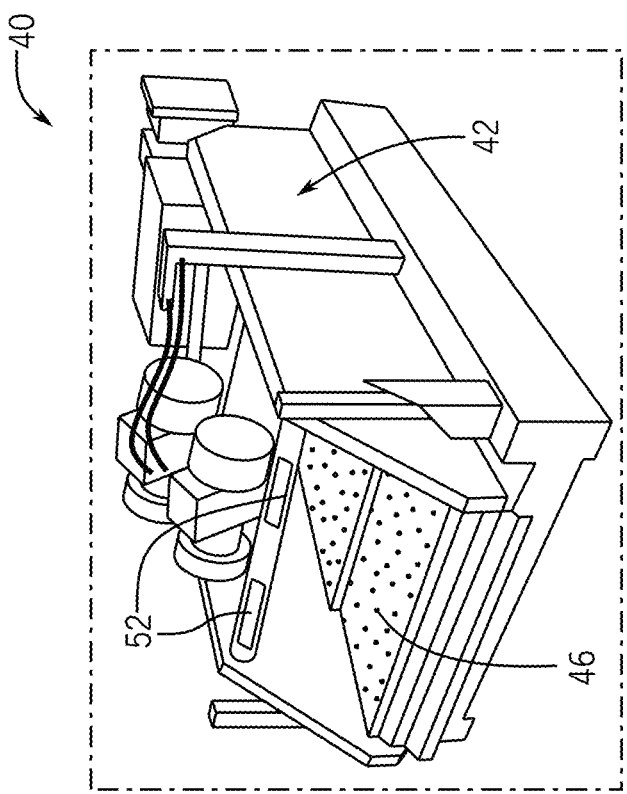
FIG. 2 illustrates drill bit cuttings that have been removed from drilling fluid, in accordance with embodiments of the present disclosure.

As illustrated in FIG. 1, drill bit cuttings that are formed by the drill bit 16 crushing rocks in the formation 24 may typically be removed from the returned drilling fluid 28 by a shale shaker 40 in the return flow line 34 such that the drilling fluid 28 may be reused for injection, where the shale shaker 40 includes a shaker pit 42 and a gas trap 44. FIG. 2 illustrates drill bit cuttings 46 that have been removed from the drilling fluid 28 in the shaker pit 42 of the shale shaker 40 before the drilling fluid 28 is delivered to a mud pit 48 from which the mud pump 30 may draw the drilling fluid 28, as illustrated in FIG. 1. In addition, FIG. 3 illustrates how drill bit cuttings 46 may be created by the drill bit 16, and then flow back up within the drilling fluid 28 through an annulus formed between the wall of the borehole 22 and an outer diameter of the drill string 12.

In addition, as illustrated in FIG. 1, in certain embodiments, an analysis and control system 50 (e.g., a mud logging unit) may be used to control the drilling operation 10, as well as provide analysis of the drill bit cuttings 46, as described in greater detail herein. In particular, in certain embodiments, the analysis and control system 50 may be configured to automatically analyze photos of the drill bit cuttings 46 that are automatically captured by one or more cameras 52 during performance of the drilling operation 10 illustrated in FIG. 1, as described in greater detail herein. As illustrated in FIG. 2, in certain embodiments, the one or more cameras 52 may be directed associated with (e.g., directly attached to or disposed adjacent to or in close proximity to) the shale shaker 40. However, in other embodiments, the one or more cameras 52 may be other types of cameras not directly associated with the shale shaker 40.

Figure 4:
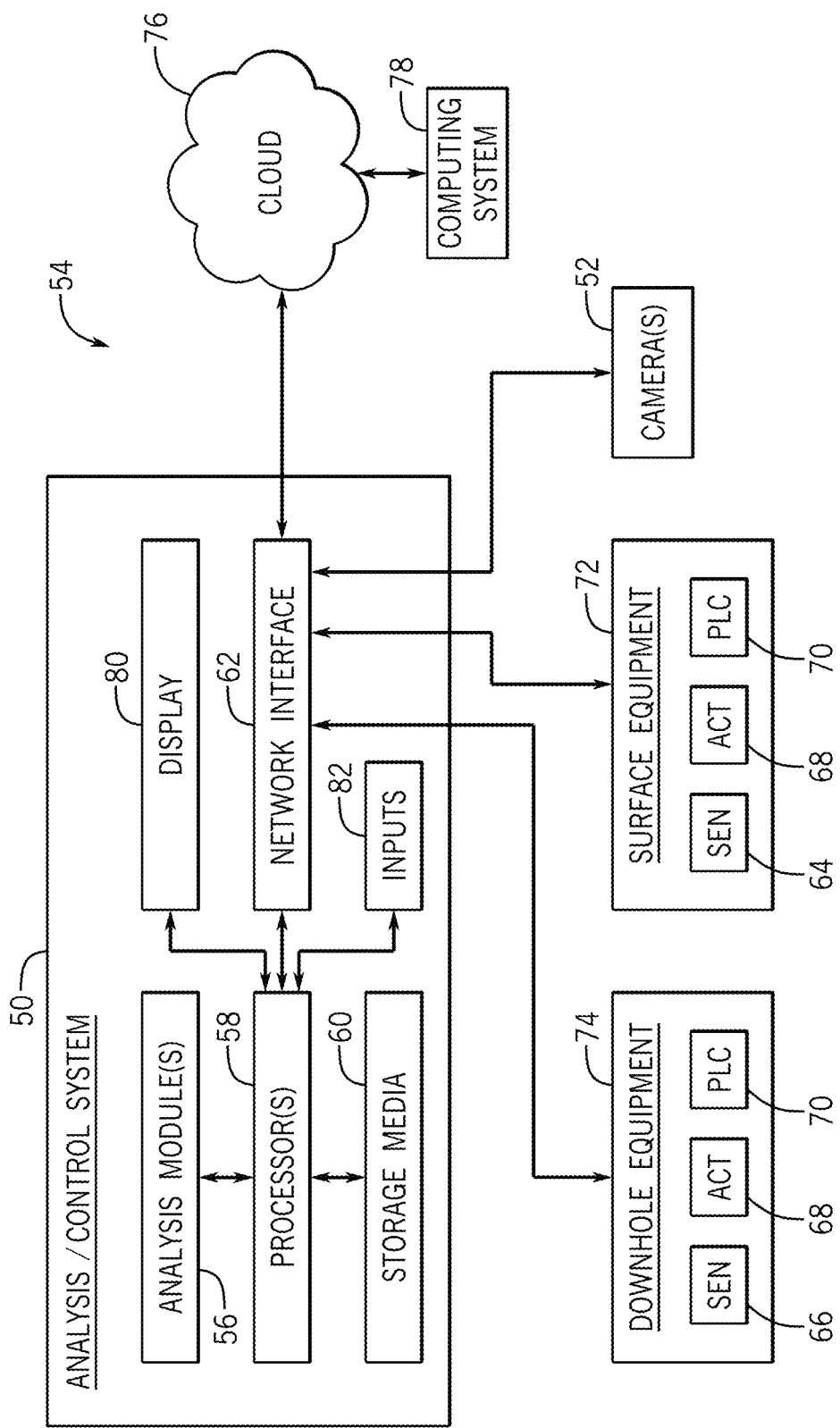
FIG. 4 illustrates a system that includes an analysis and control system to monitor and control the drilling operation of FIG. 1, in accordance with embodiments of the present disclosure.

FIG. 4 illustrates a system 54 that includes an analysis and control system 50 to monitor and control the drilling operation 10 of FIG. 1, as described in greater detail herein. In certain embodiments, the analysis and control system 50 may include one or more analysis modules 56 (e.g., a program of processor executable instructions and associated data) that may be configured to perform various functions of the embodiments described herein including, but not limited to, utilizing certain analysis algorithms to analyze photos of drill but cuttings 46 that are captured by one or more cameras 52, as described in greater detail herein. In certain embodiments, to perform these various functions, an analysis module 56 executes on one or more processors 58 of the analysis and control system 50, which may be connected to one or more storage media 60 of the analysis and control system 50. Indeed, in certain embodiments, the one or more analysis modules 56 may be stored in the one or more storage media 60.

In certain embodiments, the one or more processors 58 may include a microprocessor, a microcontroller, a processor module or subsystem, a programmable integrated circuit, a programmable gate array, a digital signal processor (DSP), or another control or computing device. In certain embodiments, the one or more storage media 60 may be implemented as one or more non-transitory computer-readable or machine-readable storage media. In certain embodiments, the one or more storage media 60 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the processor-executable instructions and associated data of the analysis module(s) 56 may be provided on one computer-readable or machine-readable storage medium of the storage media 60 or, alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 60 may be located either in the machine running the machine-readable instructions, or may be located at a remote site from which machine-readable instructions may be downloaded over a network for execution.

In certain embodiments, the processor(s) 58 may be connected to a network interface 62 of the analysis and control system 50 to allow the analysis and control system 50 to communicate with various surface sensors 64 (Internet of Things (IoT) sensors, gauges, and so forth) and/or downhole sensors 66 described herein, as well as communicate with actuators 68 and/or PLCs 70 of surface equipment 72 and/or of downhole equipment 74 for the purpose of monitoring and/or controlling operation of the drilling operation 10, as described in greater detail herein. In addition, in certain embodiments, the network interface 62 may also facilitate the analysis and control system 50 to communicate with one or more cameras 52, as described in greater detail herein. In certain embodiments, the network interface 62 may also facilitate the analysis and control system 50 to communicate data to a cloud-based service 76 (or other wired and/or wireless communication network) to, for example, archive the data or to enable external computing systems 78 (e.g., cloud-based computing systems, in certain embodiments) to access the data and/or to remotely interact with the analysis and control system 50. For example, in certain embodiments, some or all of the analysis modules 56 described in greater detail herein may be executed via cloud and edge deployments.

In certain embodiments, the analysis and control system 50 may include a display 80 configured to display a graphical user interface to present results on the analysis described herein. In addition, in certain embodiments, the graphical user interface may present other information to operators of the equipment 72, 74. For example, the graphical user interface may include a dashboard configured to present visual information to the operators. In certain embodiments, the dashboard may show live (e.g., real-time) data as well as the results of the analysis described herein. In addition, in certain embodiments, the analysis and control system 50 may include one or more input devices 82 configured to enable the operators to, for example, provide commands to the equipment 72, 74 described herein. In addition, in certain embodiments, the display 80 may include a touch screen interface configured to receive inputs from operators.

It should be appreciated that the system 54 illustrated in FIG. 4 is only exemplary, and that the system 54 may have more or fewer components than shown, may combine additional components not depicted in the embodiment of FIG. 4, and/or the system 54 may have a different configuration or arrangement of the components depicted in FIG. 4. In addition, the various components illustrated in FIG. 4 may be implemented in hardware, software, or a combination of both hardware and software, including one or more signal processing and/or application specific integrated circuits. Furthermore, the operations of the system 52 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

Figure 5:
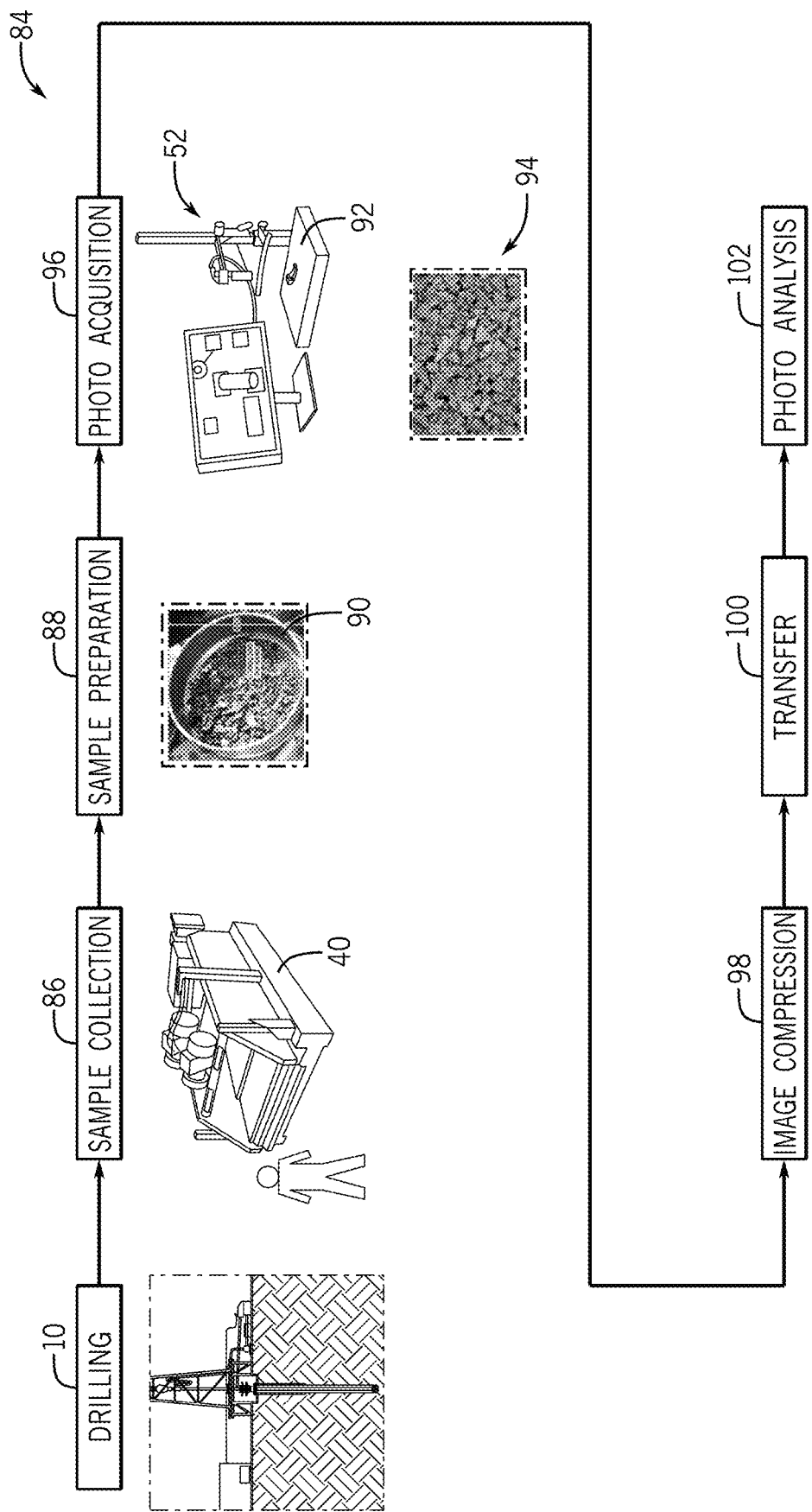
FIG. 5 illustrates a cuttings analysis procedure that may be performed by the analysis and control system of FIG. 4, in accordance with embodiments of the present disclosure.

In conventional systems, drill bit cuttings 46 are analyzed by mud loggers in a mud logging unit. These conventional systems are generally human-dependent. The embodiments described herein enhance the analysis of such drill bit cuttings 46. FIG. 5 illustrates a cuttings analysis procedure 84 that may be performed by the analysis and control system 50 of FIG. 4. As illustrated in FIG. 5, the cuttings analysis procedure 84 begins with a drilling operation 10 that generates rock particles (e.g., that include the drill bit cuttings 46 described above). Then, the rock particles are collected, for example, from a shale shaker 40, as described with respect to FIG. 2 (e.g., sample collection 86).

Then, in certain embodiments, the rock particles may be prepared for analysis by, for example, drying the rock particles in an oven for analysis (e.g., sample preparation 88). In addition, in certain embodiments, the sample preparation 88 may include sieving the rock particles using one or more meshes 90 to select cuttings 46 that fall in certain ranges of sizes. In certain embodiments, the sizes of the meshes 90 may be in a range of between 0.25 millimeters (mm) and 3.0 mm and may be approximately 0.25 mm, approximately 0.50 mm, approximately 0.75 mm, approximately 1.0 mm, approximately 1.25 mm, approximately 1.50 mm, approximately 1.75 mm, approximately 2.0 mm, approximately 2.25 mm, approximately 2.50 mm, approximately 2.75 mm, or approximately 3.0 mm. It will be appreciated that consecutive meshes 90 through which the rock particles may be sieved may begin with larger meshes 90 followed by progressively smaller meshes 90 such that larger cuttings 46 are sieved sooner and smaller cuttings 46 are sieved later until such point where the sieved rock particles are so fine that they are no longer considered cuttings 46 per se. It will also be appreciated that the size of a particle cutting 46 is the smallest axis of the cutting 46 when the cutting 46 is approximated as an ellipsoid. In certain embodiments, the sample preparation 88 may include placing the sieved cuttings 46 in a tray 92 having a relatively vivid background color (e.g., pure magenta (e.g., with RGB values of 255, 0, 255), pure blue (e.g., with RGB values of 0, 0, 255), pure green (e.g., with RGB values of 0, 255, 0), and so forth). In general, such colors do not exist in nature and, accordingly, help instance segmentation models avoid detecting the background of the tray 92 as part of the instance. In certain situations, the tray 92 may be prepared by a human, so the distribution of the cuttings 46 is often random. For example, the cuttings 46 may be touching or piled in some areas on the tray 92 and may be sparsely distributed in other areas.

Then, in certain embodiments, the tray 92 may be placed in front of a camera 52 and a photo 94 of the cuttings 46 may be taken (e.g., photo acquisition 96). As described in greater detail herein, in certain embodiments, during the photo acquisition 96, illumination, color, and resolution of the photo 94 are calibrated and standardized in order to obtain quantitative and reliable measurements of pixel values between photos 94. For example, in certain embodiments, color/illumination calibration is obtained by using colorimetry algorithms against previously analyzed photos 94 and a current photo 94 of interest, while resolution calibration may be based on lens focal length, focal distance, and sensor size/resolution for the current photo 94 of interest as compared to that of previously analyzed photos 94. All of these parameters may vary, but the final image is "calibrated" and the same objects will be digitalized with reasonably near values. Pixel values and size are, therefore, treated as effective measurements of the particle rather than mere representation. The embodiments described herein enable the creation of such calibrated and error-assessed input images 94. Without such calibration, final object classification would vary because of the acquisition rather than because of any real-world difference.

Then, in certain embodiments, the photo 94 of the cuttings 46 may be compressed for easier transfer (e.g., image compression 98). In particular, well sites are quite often in relatively remote locations where the available network bandwidth may be relatively slow. Accordingly, compressing the photos 94 of cuttings 46 may facilitate transfer of the photos 94. It will be appreciated that compressing the photos 94 of cuttings 46 may not be as beneficial if there is higher bandwidth at the well site (e.g., when the well site has cable internet access). Then, in certain embodiments, the photo 94 of the cuttings 46 may be transferred 100, for example, to the analysis and control system 50 and/or the computing system 78 illustrated in FIG. 4 for analysis, as described in greater detail herein. Then, in certain embodiments, analysis of the photo 94 of the cuttings 46 (e.g., photo analysis 102) may include extraction of geologically meaningful information relating to the cuttings 46 from the photo 94, as described in greater detail herein.

In certain embodiments, the analysis and control system 50 is configured to separate pixels of individual rock particles from multiple particles (e.g., cuttings 46) depicted in a calibrated photograph 94. In addition, in certain embodiments, the analysis and control system 50 is configured to determine relevant morphological (e.g., size, shape, and so forth), color, and texture data from one or more individual rock particles (e.g., cuttings 46) depicted in a calibrated photograph 94. In addition, in certain embodiments, the analysis and control system 50 is configured to utilize extracted information from calibrated photographs 94 to perform geological/lithological classification at a plurality of different hierarchical levels (e.g., at a single particle/cutting level, at a single sample level of a plurality of cuttings, at a particular depth interval within a borehole 22, for a particular geological formation 24, for an entire well, for an entire well field, and so forth). As described in greater detail herein, consolidating the analysis results in a plurality of hierarchical levels enables operators to analyze the cuttings 46 in a much more robust (and automated and more accurate) manner than conventional techniques. In addition, in certain embodiments, the analysis and control system 50 is configured to utilize the information derived herein based on the calibrated photographs 94 to create a mud logging report. In addition, in certain embodiments, the analysis and control system 50 is configured to output from the calibrated photographs 94 any relevant information that can be integrated with other well-related answer products. In addition, in certain embodiments, the analysis and control system 50 is configured to utilize a supervised machine learning model (e.g., from another well in the same field or another field with similar geological setting) to infer the lithology type from a photograph 94 from the current well. In addition, in certain embodiments, the analysis and control system 50 is configured to utilize all of this type of information to automatically adjust operating parameters of a drilling operation 10 (e.g., drilling fluid composition, drill bit speed, and so forth), as described in greater detail herein.

However, while the cuttings analysis procedure 84 illustrated in FIG. 5 has been described with particular reference to analyzing cuttings 46 to determine geologically meaningful information relating to the cuttings 46 from photos 94, the embodiments described herein may be extended to the analysis of photos 94 to identify features of other types of objects, rather than just cuttings 46. In particular, the embodiments described herein provide instance segmentation of various objects that are depicted in photos 94, as described in greater detail herein. Specifically, the embodiments described herein provide a segmentation workflow that includes three main three main steps described in greater detail herein: (1) architecture selection, (2) model training, and (3) inference.

Architecture Selection

Figure 7B:
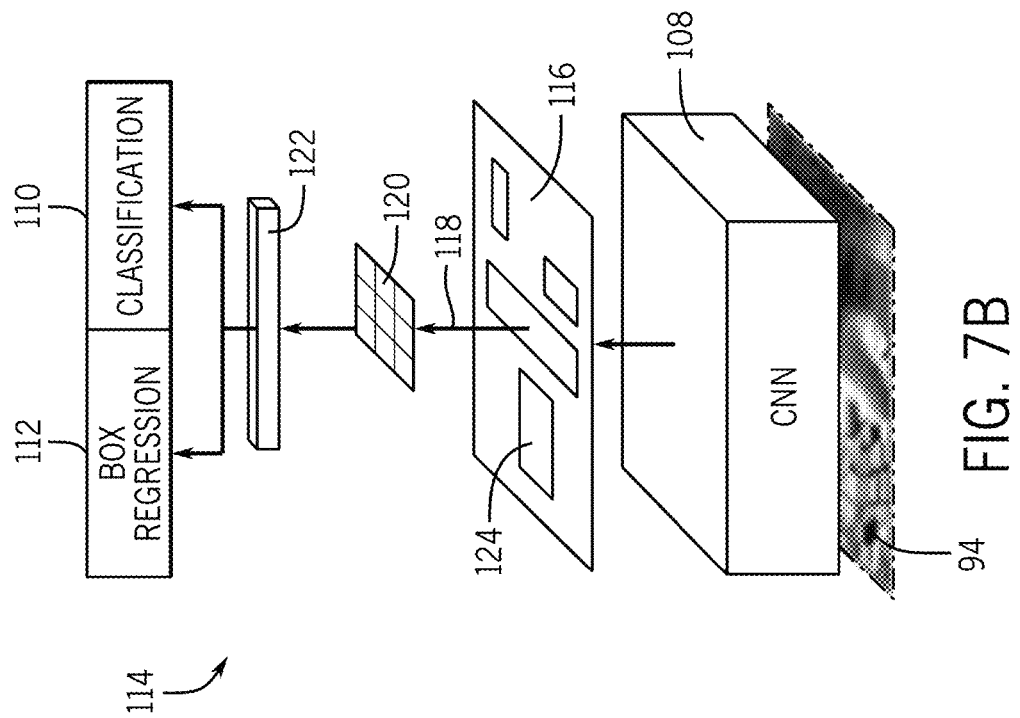
FIGS. 7A through 7D illustrates various different version of region-based convolutional neural network (R-CNN) architectures, in accordance with embodiments of the present disclosure.
Figure 7A:
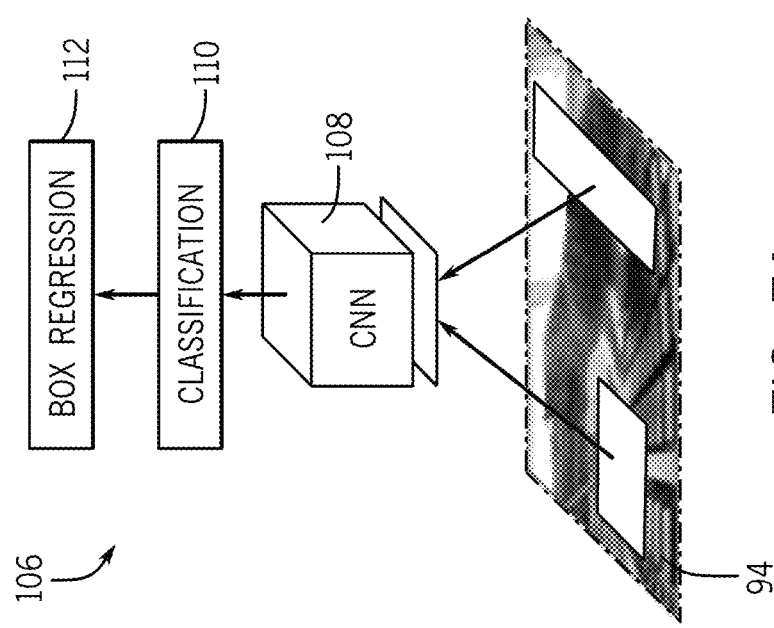

In certain embodiments, Mask R-CNN may be used to identify various objects in photos 94 (e.g., people 104 in the left-hand photo 94 and cuttings 46 in the bottom right-hand photo 94 of FIG. 6). For context, FIGS. 7A through 7D illustrate the evolution of R-CNN during recent years. FIG. 7A illustrates base R-CNN 106, wherein convolutional feature extraction is performed for a photo 94 by a convolutional neural network (CNN) 108 to enable a classification module 110 and a box regression module 112 to process in series. FIGS. 7B and 7C illustrate Faster R-CNN 114, which utilizes a feature map 116 of the extracted features and a regions of interest (ROI) pooling layer 118 to create a fixed size feature map 120 that enables fully connected layers 122 that may be used by the classification module 110 and the box regression module 112 to process in parallel. FIG. 7B illustrates embodiments where ROIs 124 may be determined by independent methods, whereas FIG. 7C illustrates embodiments where ROIs 124 may be determined by a dedicated region proposal network (RPN) 126.

Figure 7D:
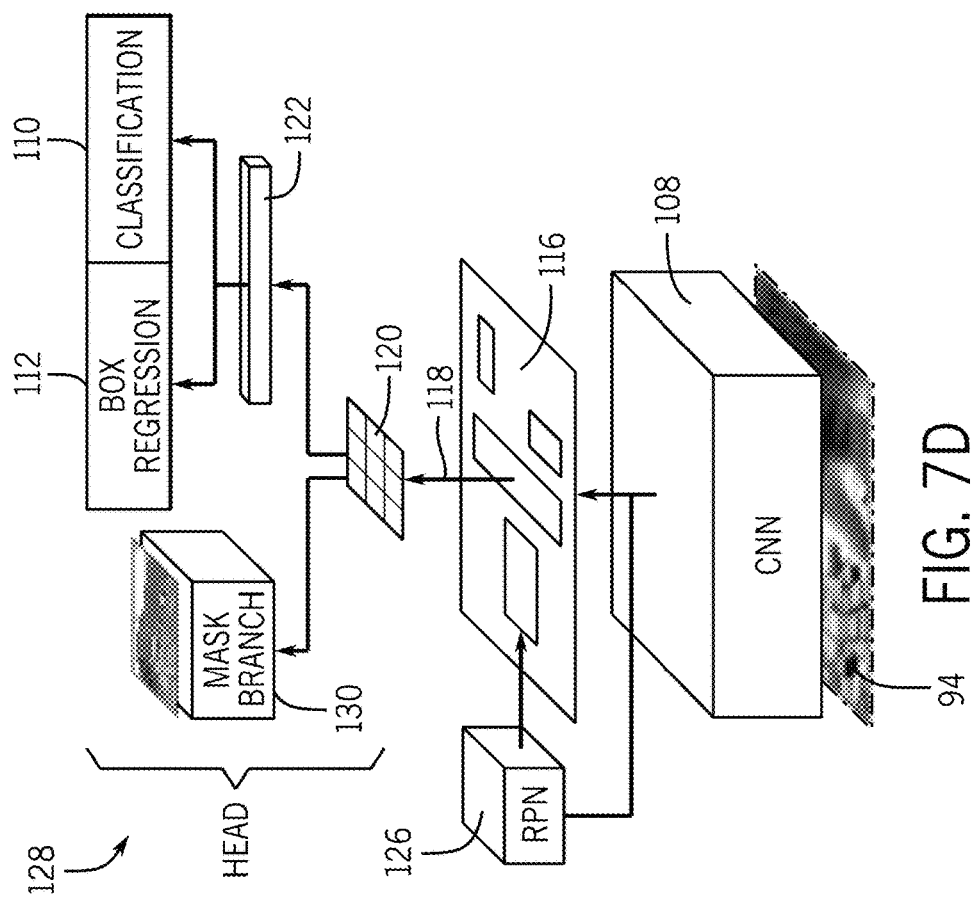
Figure 7C:
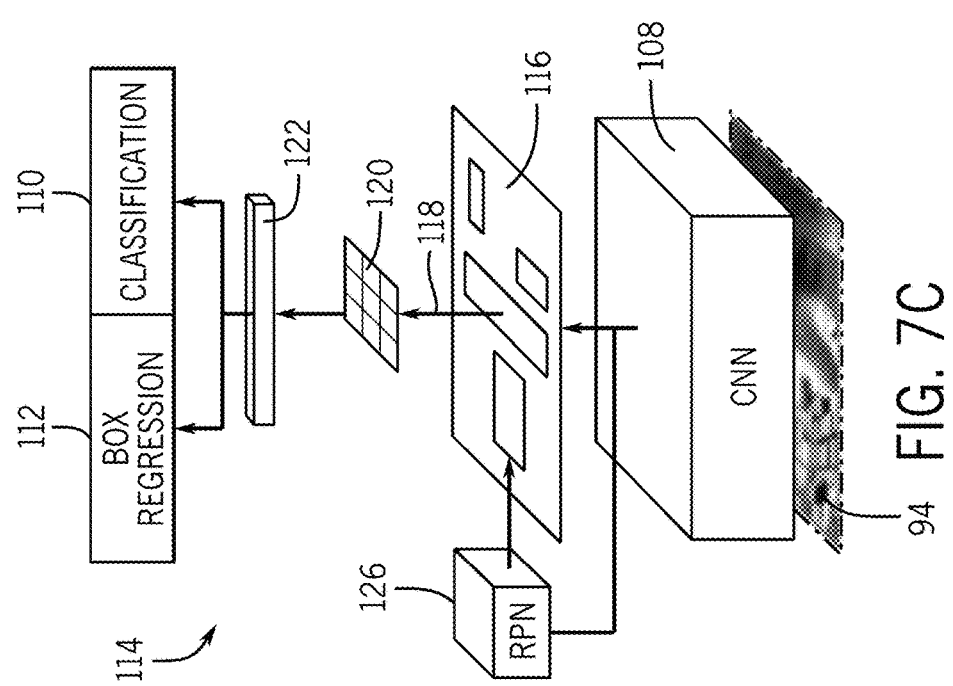

FIG. 7D illustrates Mask R-CNN 128, which adds a mask branch 130. In general, Faster R-CNN 114 is an architecture for object detection that only outputs bounding boxes of detected objects in an image 94. Mask R-CNN 128 is an architecture of several analysis modules, each analysis module being customizable. For example, in certain embodiments, Mask R-CNN 128 may include feature pyramid networks in the RPN 126, which may be applied in various applications to outperform conventional (e.g., non-data driven) methods. In addition, certain embodiments of Mask R-CNN 128 described herein may utilize a deep convolutional network architecture from the Resnet family (e.g., including Resnet-50 and Resnet-101) as the CNN 108.

Figure 8:
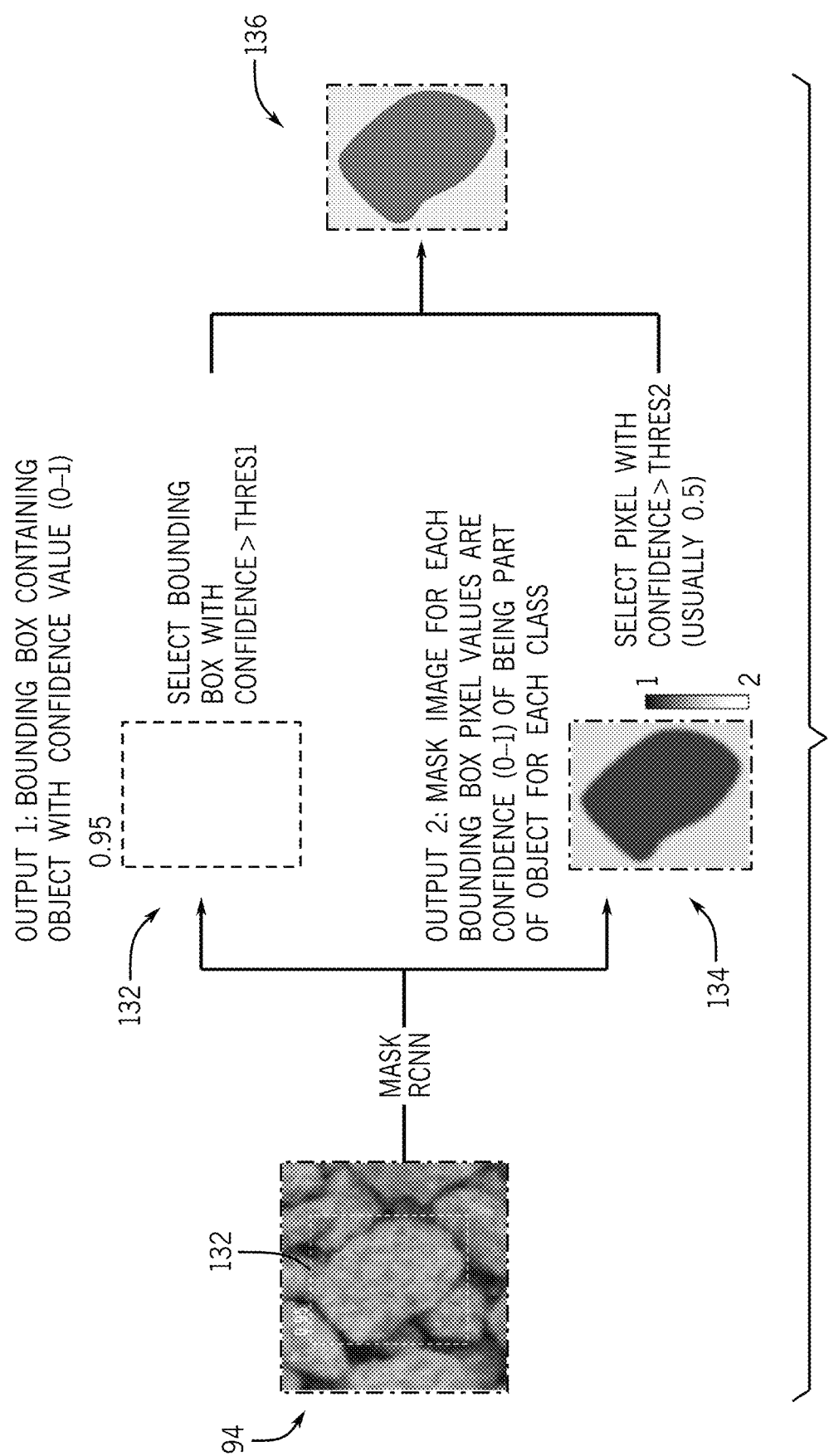
FIG. 8 illustrates how bounding boxes and mask images may be generated for photos, in accordance with embodiments of the present disclosure.

In certain embodiments, the Mask R-CNN 128 may produce two main outputs: (1) bounding boxes 132 and (2) mask images 134, as illustrated in FIG. 8. In certain embodiments, bounding boxes 132 may be defined as a set of four x-y coordinates in an image 94, each of which indicate an image region that contains an object of interest. In certain embodiments, each bounding box 132 may be associated with a confidence score that ranges from 0 to 1 (e.g., with greater values indicating higher confidence regarding the object detection of the particular bounding box 132). In general, the confidence score is a parameter that may be fine-tuned case-by-case and/or presented to a user via a user interface. In addition, in certain embodiments, for each bounding box 132, a mask image 134 (e.g., that is the same size of the associated bounding box 132) may be provided. Each value in the mask image 134 indicates the confidence score of being part of the particular detected object, which also ranges from 0 to 1. In certain embodiments, this can also be a user threshold that may be fine-tuned case-by-case. However, conventionally, 0.5 may be used. In other words, the pixels with the confidence of over 0.5 are considered as detected object-related pixels. As illustrated in FIG. 8, in certain embodiments, bounding boxes 132 that have a confidence score over a particular threshold (e.g., Thres1) and pixels of mask images 134 that have a confidence score over another particular threshold (e.g., Thres2) may be combined to create an object image 136 of a particular object of interest.

Mask R-CNN 128 is a model architecture that falls in the supervised learning category, meaning that it requires a training dataset that consists of images 94 and corresponding labels. In the case of instance segmentation, the label is a binary image with the same size as the mask image 134 containing an object mask. In general, the labelling process requires time and tends to be relatively tedious. The terms labelling and annotation are used interchangeably herein.

Model Training

Figure 9:
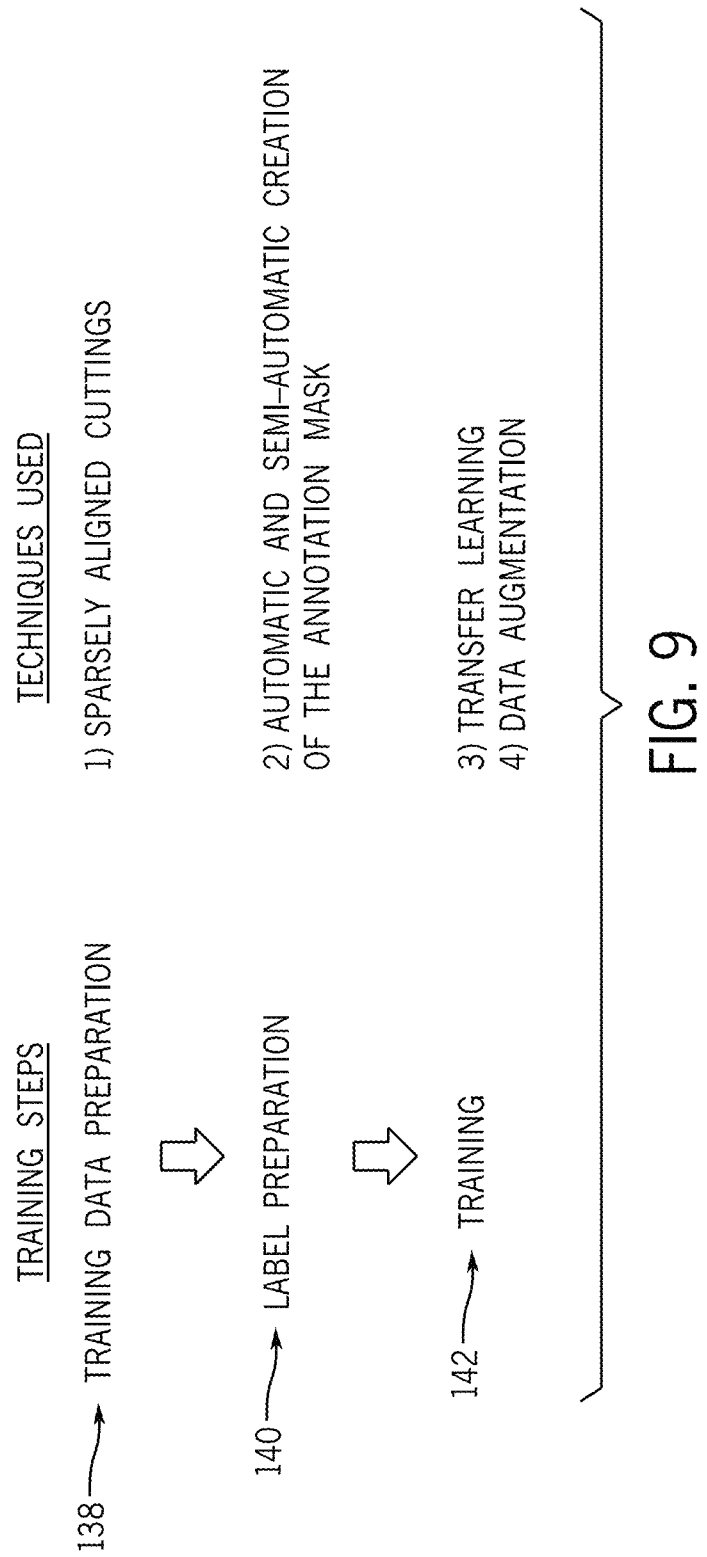
FIG. 9 illustrates a workflow for neural network model training, in accordance with embodiments of the present disclosure.

As such, the analysis and control system 50 described herein utilizes a plurality of analysis modules 56 that enable an architecture that utilizes a Mask R-CNN 128 to analyze photos 94 to identify particular objects in the photos 94, as described in greater detail herein. Specifically, the analysis modules 56 facilitate the creation of one or more models, the parameters for which need to be trained with relevant datasets to achieve optimal segmentation, as described in greater detail herein. A challenge in training the one or more models is to obtain models that produce satisfactory results with the least possible effort to take photos 94 and annotate the training data. The embodiments described herein reduce this effort as much as possible at each of the training steps of training data preparation 138 (e.g., where the technique used is sparsely aligned cuttings 46, for example), label preparation 140 (e.g., where the technique used is automatic and semi-automatic creation of annotation masks), and training 142 (e.g., where the techniques used are transfer learning and data augmentation), as illustrated in FIG. 9.

1) Sparsely Aligned Cuttings in the Training Data

Figure 10:
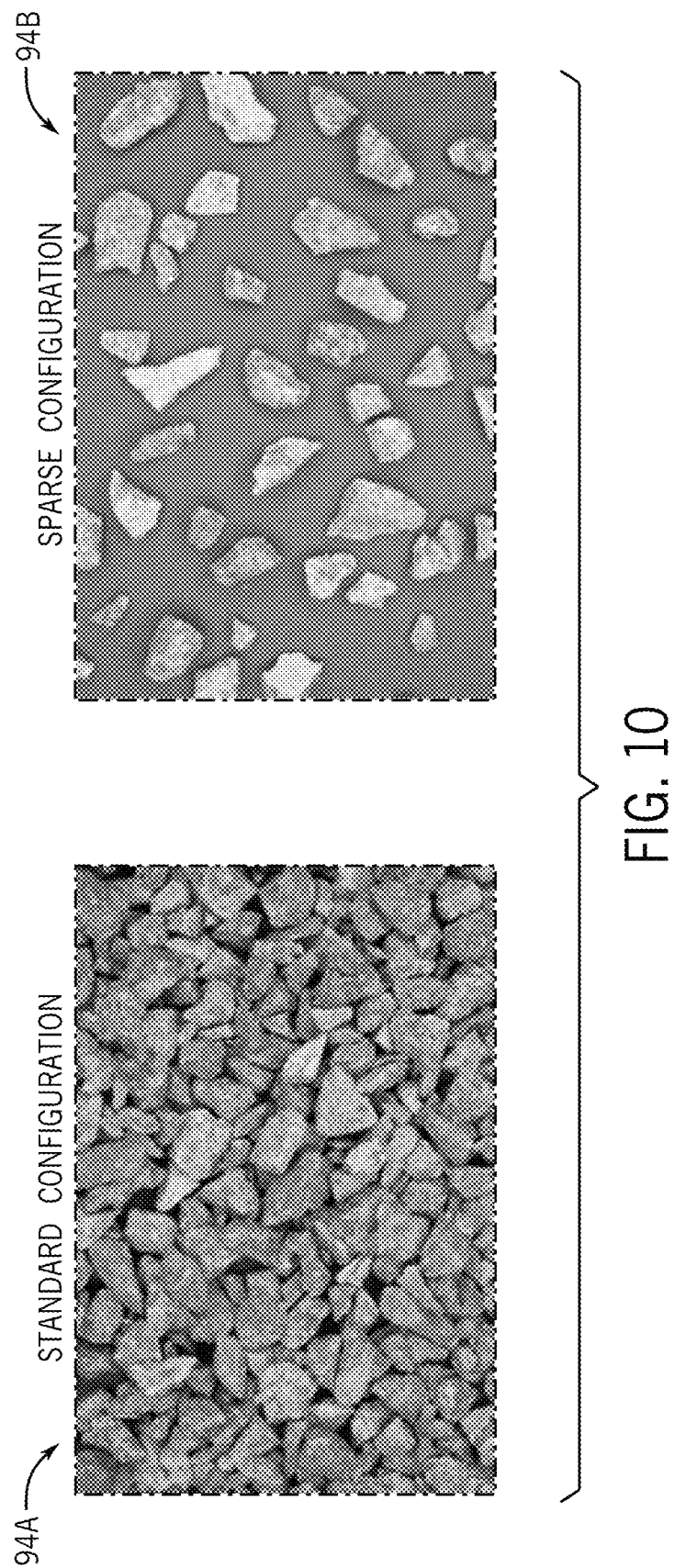
FIG. 10 illustrates cuttings distributed in standard and sparse configurations, in accordance with embodiments of the present disclosure.

The standard configuration in the laboratory was customized to collect photos 94 that were suitable for training the model. Specifically, cuttings 46 were aligned relatively sparsely on a tray 92 (e.g., spread out manually with fingers such that none of the cuttings 46 touch each other or overlap), as illustrated in FIG. 10. In the training phase, only those photos 94B with such a sparse configuration were used because the annotation cost is relatively high with standard photos 94A where cuttings 46 can be touching or piled onto each other (e.g., the standard configuration). In contrast, the sparse configuration photos 94B are much easier to annotate. In addition, as described above, a tray 92 having a colored background was used, thereby making it much easier to automatically carry out the segmentation described herein. In addition, it is also much easier to label all of the cuttings 46 in photos 94B with such a sparse configuration, as opposed to standard photos 94A.

It is important to note that, unless additional architecture is introduced, all of the cuttings 46 in a given photo 94 need to be labeled to prepare a clean training dataset. In particular, if only a portion of the cuttings 46 are labeled in any given photo 94, the model would be trained to detect some cuttings 46 and not to detect other cuttings 46, which could negatively affect the stable convergence of the training loss as well as the inference results.

2) Automatic and Semi-Automatic Creation of Annotation Masks

In general, it is important that annotations masks are as accurate and precise as possible to better train a model. However, such accuracy and precision usually requires more human intervention. As such, in order to reduce the human intervention in the annotation process, the embodiments described herein introduce a combined automated and semi-automated annotation process step-by-step, thereby improving the model. In particular, five specific steps are performed by the analysis and control system 50 described herein:

Step 1. Initial annotation creation with conventional methods: First, mask images 134 are generated using traditional methods (e.g., a watershed transform proceeded by morphological operations with fixed parameters, in certain embodiments). Visually, about 60% precision and recall is achieved in Step 1. The mask images 134 are relatively rough, but they function as a good start for the first training.

Step 2. Model training with the annotations from Step 1: Next, the annotations from Step 1 are used to train a Mask R-CNN model. Visually, about 70% precision and recall is achieved in Step 2.

Step 3. Annotation creation with the Mask R-CNN model from Step 2 and manual refinement (e.g., performed by a human): Next, the Mask R-CNN model from Step 2 is integrated in a web-based annotation tool, wherein an inference is performed using the Mask R-CNN model from Step 2, and the annotations from Step 2 are manually refined by a human. Since the Mask R-CNN model already detects 70% of the cuttings 46 correctly, this manual refinement is relatively low-labor intensive.

Step 4. Model training with the annotations from Step 3: Next, the annotations from Step 3 are used to train a Mask R-CNN model. In this step, the Mask R-CNN model showed significant improvement and achieved much better precision and recall.

Step 5. Semi-supervised learning framework: As more photos 94 in the sparse configuration are collected, a semi-supervised approach may be used, which is a method that is used when many unlabeled data and some labeled data are available. With this approach, the model infers the instance segments and automatically incorporates the image and the mask in the training dataset. This will completely automate the annotation task when enough photos 94 are added to the dataset.

3) Transfer Learning

The Mask R-CNN model was first pre-trained with a dataset that contains common objects such as cars, people, and so forth, using a machine learning framework such as PyTorch. Then, the Mask R-CNN model was re-trained with a cutting dataset. This technique is called transfer learning. The principle of the transfer learning is that by re-training a model that is pre-trained with a dataset from a different domain where the annotated data is abundant, good results may be obtained even with a relatively small amount of a data in the target domain.

4) Data Augmentation

Then, relatively heavy data augmentation techniques were used to increase the training data for robustness. In particular, the following transforms were implemented: vertical flip; horizontal flip; vertical flip and horizontal flip; RGB noise; contrast change; rotation; resizing; blurring, and so forth. Each transform was applied to the input image 94 just before the training (i.e., in memory and not saved as a file) randomly with the probably of 0.5 for each transform. Since Mask R-CNN is an architecture that is scale-invariant and translation-invariant, but rotation-equivariant, it makes sense to introduce flips and rotation to improve the results. The quality of the original photo 94 may be affected by various factors including, but not limited to, hardware errors (e.g., lighting, unfocused) and photo data compression due to data transfer. To include such relatively degraded photos 94 in the training, various types of image noise that are supposedly similar to the noise produced during the photo acquisition may be added, in certain embodiments.

Inference

Inference corresponds to a step that uses the re-trained Mask R-CNN model to segment instances taking an image 94 as an input. The standard inference may be simply expressed as:

$$\text{Instances} = \text{Model}_{retrained}(\text{image}; t_{box}, t_{mask})$$

where $t_{box}$ and $t_{mask}$ are the thresholds for the box and mask confidences (of the bounding boxes 132 and the mask images 134, respectively), respectively. Since such thresholds are involved, there is a question of the precision-recall tradeoff. For example, if high thresholds are set, the detection of the Mask R-CNN model is usually of high quality, but the Mask R-CNN model tends to miss some instances (i.e., high precision, low recall). Conversely, if low thresholds are set, the Mask R-CNN model will detect more instances, but the Mask R-CNN model tends to mis-detect some instances (i.e., low precision, high recall).

Considering the user interaction when integrated in a software product, it is important that the instances are detected as precisely as possible so that users can avoid manual correction of the detection result, which is time consuming, to the extent possible. Compared with this, missing some instances is rather acceptable. This means that more importance may be placed on precision than recall, and this is enabled by setting the thresholds higher. It has been observed that when the thresholds for bounding box and mask pixels (of the bounding boxes 132 and the mask images 134, respectively) are set to a value larger than 0.5, the detected instances are of sufficiently high quality.

Figure 11:
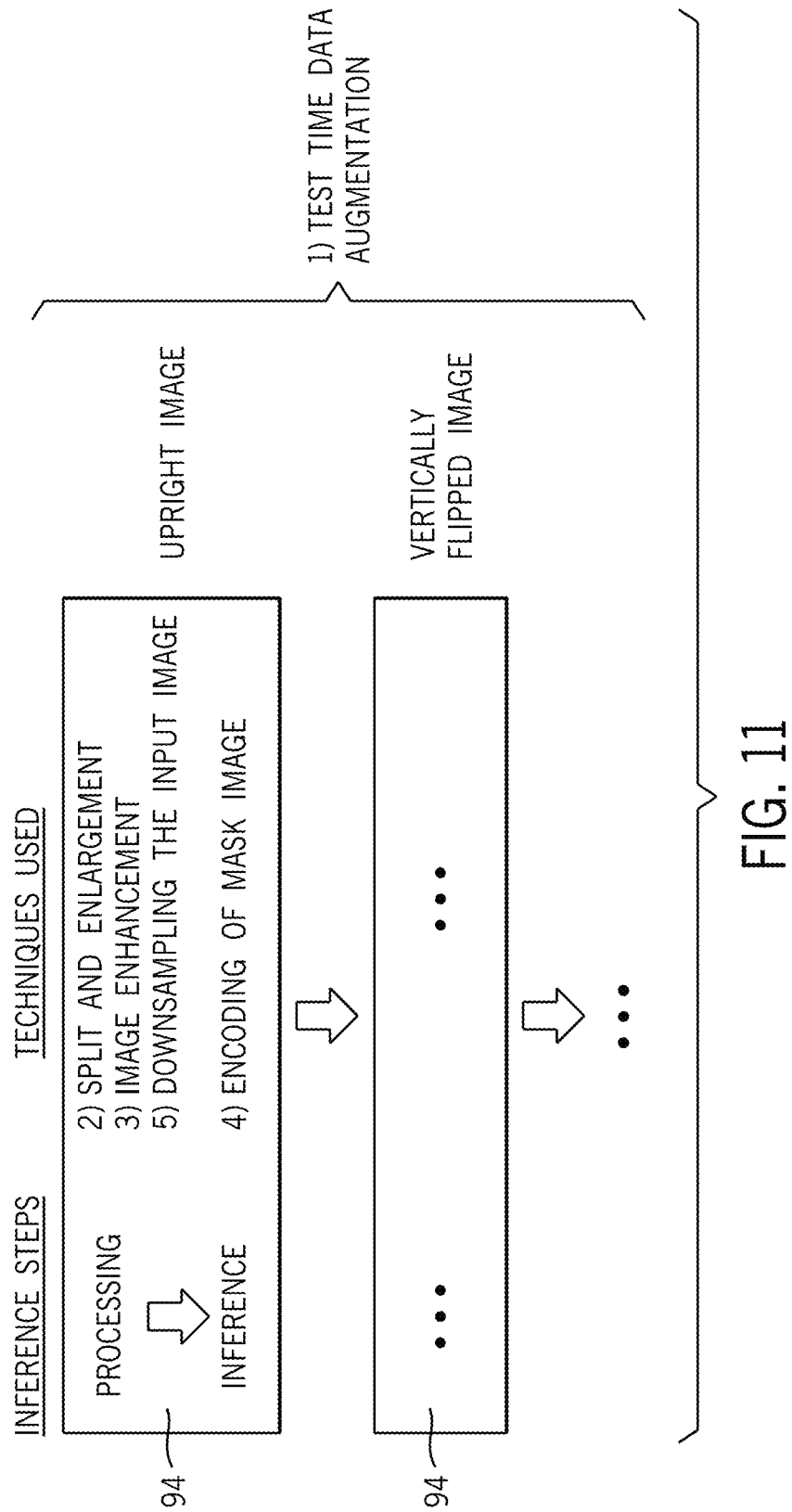
FIG. 11 illustrates a workflow for test time data augmentation, in accordance with embodiments of the present disclosure.

There are cases where the Mask R-CNN model detects most instances with $t_{box}$ and $t_{mask}$ set to 0.5. However, with those thresholds, there are cases where a non-negligible number of cuttings 46 are not detected (i.e., the recall is lower than expected). Even if precision is more important than recall, it is desirable to detect as many instances in an image 94 as possible. Hence, a few techniques are introduced below with reference to FIG. 11. For example, Steps 1), 2), 3) described below address this issue. In addition, the implementation can also be optimized for better memory usage. Without any memory optimization, a memory allocation might fail when creating output mask images 134 because the output mask confidence image may have the same size as the input image 94 with the floating-point precision. Mask R-CNN 128 in PyTorch is not particularly designed for images that contains many objects, but the number of cuttings 46 in photos 94 can reach as many as 1,000 in extreme cases. Steps 4) and 5) described below address this issue.

1) Test Time Data Augmentation

In certain embodiments, the inference may be run using the re-trained Mask R-CNN model with upright and flipped images (a total of four inference executions) and combine the output instances using non maximum suppression (NMS) to maximize the quality detection. This technique is called test-time data augmentation (TTA). In certain embodiments, $t_{box}$ and $t_{mask}$ may be set to 0.5.

Step 1: Default photo:

$$\text{Instances} = \text{Model}_{re\text{-}trained}(\text{Photo}; t_{box}=0.5, t_{mask}=0.5)$$

Step 2: Run inference with a vertically flipped photo ($\text{Photo}_{vflip}$):

$$\text{Instances}_{vflip} = \text{Model}_{re\text{-}trained}(\text{Photo}_{vflip}; t_{box}=0.5, t_{mask}=0.5)$$

Step 3: Run inference with a horizontally flipped photo ($\text{Photo}_{hflip}$):

$$\text{Instances}_{hflip} = \text{Model}_{re\text{-}trained}(\text{Photo}_{hflip}; t_{box}=0.5, t_{mask}=0.5)$$

Step 4: Run inference with a vertically and horizontally flipped photo:

$$\text{Instances}_{vflip} = \text{Model}_{re\text{-}trained}(\text{Photo}_{vhflip}; t_{box}=0.5, t_{mask}=0.5)$$

Step 5: Selectively keep instances from the instances with higher confidence:

$$\text{Instances}_{final} = \text{NMS}(\text{Instances}, \text{Instances}_{vflip}, \text{Instances}_{hflip}, \text{Instances}_{vhflip})$$

When four sets of instances are combined, there are obviously many overlapping instances. NMS selectively preserves most confident instances in priority, avoiding the overlapping detection at the same time (overlapping threshold may be set to 20% in certain embodiments). With this approach, it is possible to pick up instances that are not detected in the standard inference (i.e., Step 1 only). This approach makes sense since Mask R-CNN 128 is rotation-equivariant and flipping a photo 94 can change the result.

Figure 12:
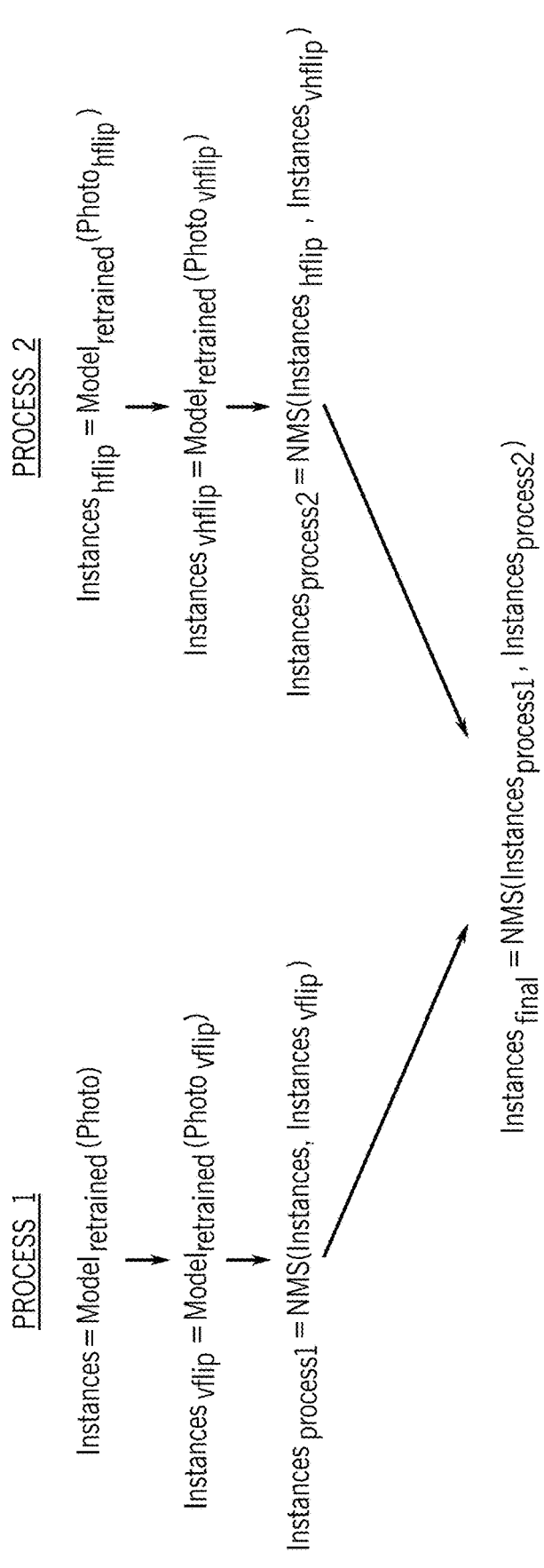
FIG. 12 illustrates a workflow for parallel processing of the test time data augmentation of FIG. 11, in accordance with embodiments of the present disclosure.

At least two optimization techniques are possible in TTA. A first technique addresses the memory issue. If Steps 1) through 5) are executed step-by-step, all of the preserved instances may take a lot of memory at Step 5. To avoid this issue, in certain embodiments, NMS may be run at every end of Step 2, 3, 4 with the cumulated instances, and only the instances kept after NMS may be preserved. A second technique addresses the computation time. In particular, NMS is a computationally intensive process. To accelerate the computation, it is possible to split up Steps 1) through 5), run the computations in parallel, and merge the results at the end (see, e.g., FIG. 12).

2) Split and Enlargement

When there are small particles, extracting a sub-portion of the image 94 and enlarging the sub-portion helps the Mask R-CNN model detect more instances. There are various ways of defining sub-portions. For example, in certain embodiments, the image 94 may be split into tiles in a regular grid with or without some overlap between neighboring tiles, and the inference may be run taking the enlarged tiles as inputs. In certain embodiments, this can be executed in multiple scales, where the scale corresponds to the size of the tile, in order not to miss large particles. At the end, the detected results may be merged using NMS.

3) Image Enhancement

It has been observed that enhancing the brightness and contrast (and possibly sharpening) of an image 94 before running the inference increases the number of detections, especially when the particular image 94 is darker than expected. As such, in certain embodiments, the brightness, contrast, and/or sharpness of a particular image 94 may be automatically adjusted based on a detected brightness of the particular image 94.

4) Encoding of Mask Image

A mask image 134 is created in memory for each of the detected instances by design of the Mask R-CNN implementation. Accordingly, when the number of detections is relatively large, a relatively large amount of memory is required, and memory allocation might fail due to a lack of memory. To avoid this issue, in certain embodiments, a binary image 94 (e.g., 0 or 1) may be created from the output mask image 134 (e.g., a floating-point value from 0 to 1) applying the confidence thresholds of 0.5 and encoded the binary image 94. Then, in certain embodiments, run length encoding (RLE) may be used to encode the binary image 94 to compress the image 94 without losing the information. In general, this leads to significant reductions of the memory usage.

In general, the output mask image 134 is created for each instance and each output mask image 134 has the same size as the input photo 94, which may take up a relatively large amount of memory. As such, in certain embodiments, instead of encoding the output mask images 134, only a portion of the output mask images 134, whose sizes correspond to their bounding boxes 132, may be stored in memory. In other embodiments, only the raw map data from the mask branch 130, whose sizes are usually smaller than the bounding boxes 132, may be stored in memory.

5) Down-Sampling the Input Image

In certain embodiments, the input image 94 may be downsized using an interpolation technique to reduce the computation time and memory usage while keeping the output quality. For example, in certain situations, the input image 94 may have a relatively high resolution (e.g., 4,912px horizontally and 2,762px vertically), but this level of resolution is not required to detect most particles in an image 94. In certain embodiments, this down-sampling may be part of an implementation of Mask R-CNN in PyTorch, for example.

Figure 13:
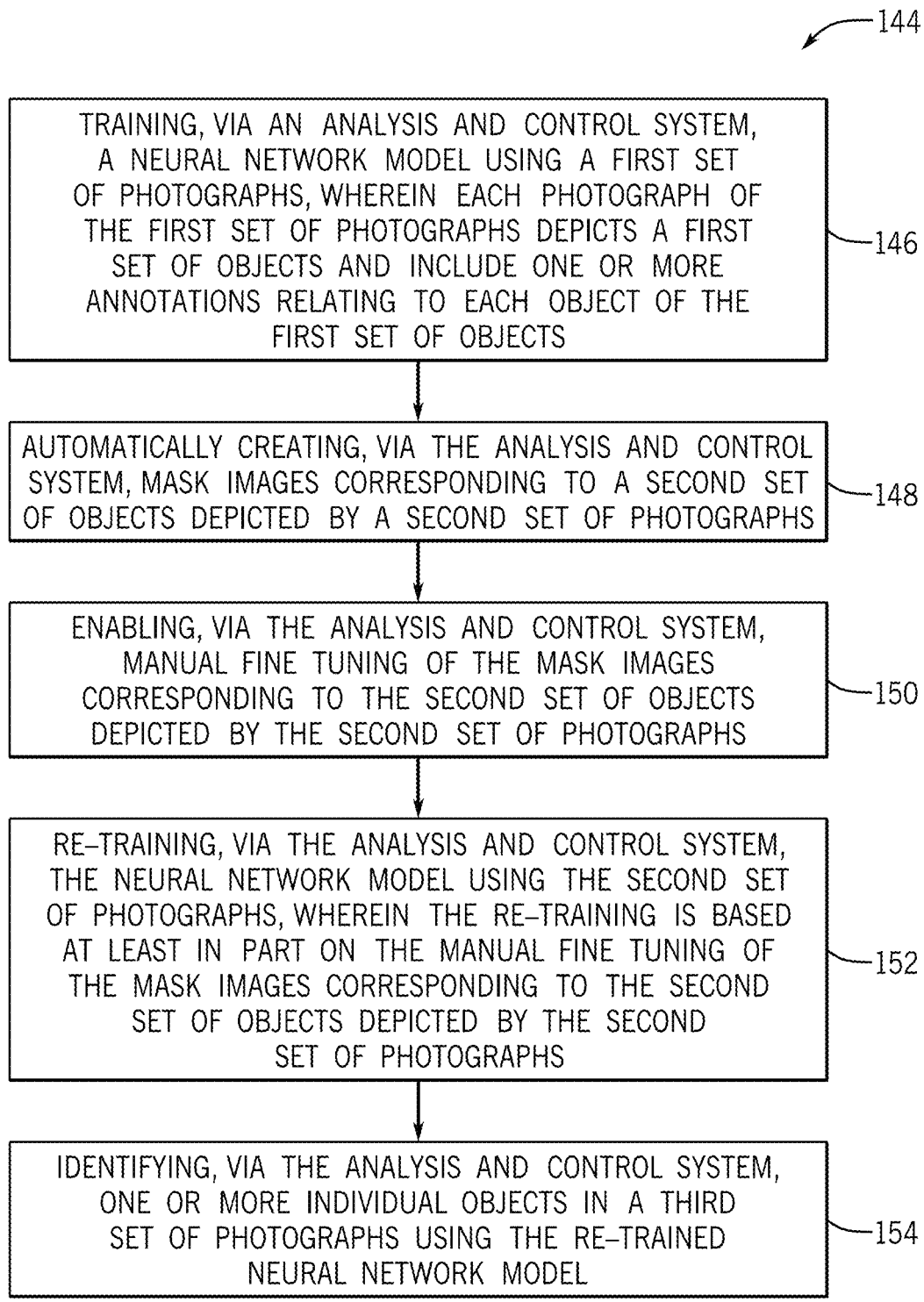
FIG. 13 is a flow diagram of a method of using the analysis and control system of FIG. 4, in accordance with embodiments of the present disclosure.

FIG. 13 is a flow diagram of a method 144 of using the analysis and control system 50 of FIG. 4, as described in greater detail herein. As illustrated, in certain embodiments, the method 144 may include training, via the analysis and control system 50, a neural network model (e.g., a Mask R-CNN model) using a first set of photographs 94, wherein each photograph 94 of the first set of photographs 94 depicts a first set of objects and include one or more annotations relating to each object of the first set of objects (block 146). In addition, in certain embodiments, the method 144 may include automatically creating, via the analysis and control system 50, mask images 134 corresponding to a second plurality of objects depicted by a second set of photographs 94 (block 148). In addition, in certain embodiments, the method 144 may include enabling, via the analysis and control system 50, manual fine tuning of the mask images 134 corresponding to the second set of objects depicted by the second set of photographs 94 (e.g., by one or more humans) (block 150). In addition, in certain embodiments, the method 144 may include re-training, via the analysis and control system 50, the neural network model using the second set of photographs 94, wherein the re-training is based at least in part on the manual fine tuning of the mask images 134 corresponding to the second set of objects depicted by the second set of photographs 94 (block 152). In addition, in certain embodiments, the method 144 may include identifying, via the analysis and control system 50, one or more individual objects in a third set of photographs 94 using the re-trained neural network model (block 154).

In addition, in certain embodiments, the first set of objects depicted by the first set of photographs 94 are of a different domain than the second set of objects depicted by the second set of photographs 94. For example, as described in greater detail herein, objects depicted by the second and third sets of photographs 94 may be in a domain of drill bit cuttings 46, whereas the objects depicted by the first set of photographs 94 may be of a domain that is not of drill bit cuttings 46 but, rather, of a domain of any other types of identifiable common objects, such as humans, vehicles, animals, boxes, balls, and any other conceivable domain of identifiable objects. In general, the first set of photographs 94 have annotations relating to common objects that are publicly available, for example, from sources like ImageNet (https://www.image-net.org/) or COCO dataset (http://cocodataset.org/#home).

In addition, in certain embodiments, the method 144 may include extracting, via the analysis and control system 50, morphological, color, and texture data from each individual cutting 46 of one or more individual cuttings 46; and performing, via the analysis and control system 50, lithological classification of the one or more individual cuttings 46 at a plurality of hierarchical levels based at least in part on the extracted morphological, color, and texture data. addition, in certain embodiments, the method 144 may include automatically adjusting, via the analysis and control system 50, one or more operating parameters of a drilling operation 10 based at least in part on the lithological classification of the one or more individual cuttings 46. In addition, in certain embodiments, the method 144 may include manually arranging the plurality of cuttings 46 depicted by the second set of photographs 94 in a relatively sparse configuration on a tray 92 having a relatively vivid background color.

In addition, in certain embodiments, identifying, via the analysis and control system 50, the one or more individual objects in the third set of photographs 94 using the re-trained neural network model may include executing a plurality of inferences on a corresponding plurality of flipped versions of each photograph 94 of the third set of photographs 94. In addition, in certain embodiments, the method 144 may include merging the plurality of inferences using NMS techniques. In addition, in certain embodiments, the method 144 may include enhancing, via the analysis and control system, the third set of photographs 94 prior to identifying the one or more individual objects in the third set of photographs 94 using the re-trained neural network model.

Figure 14:
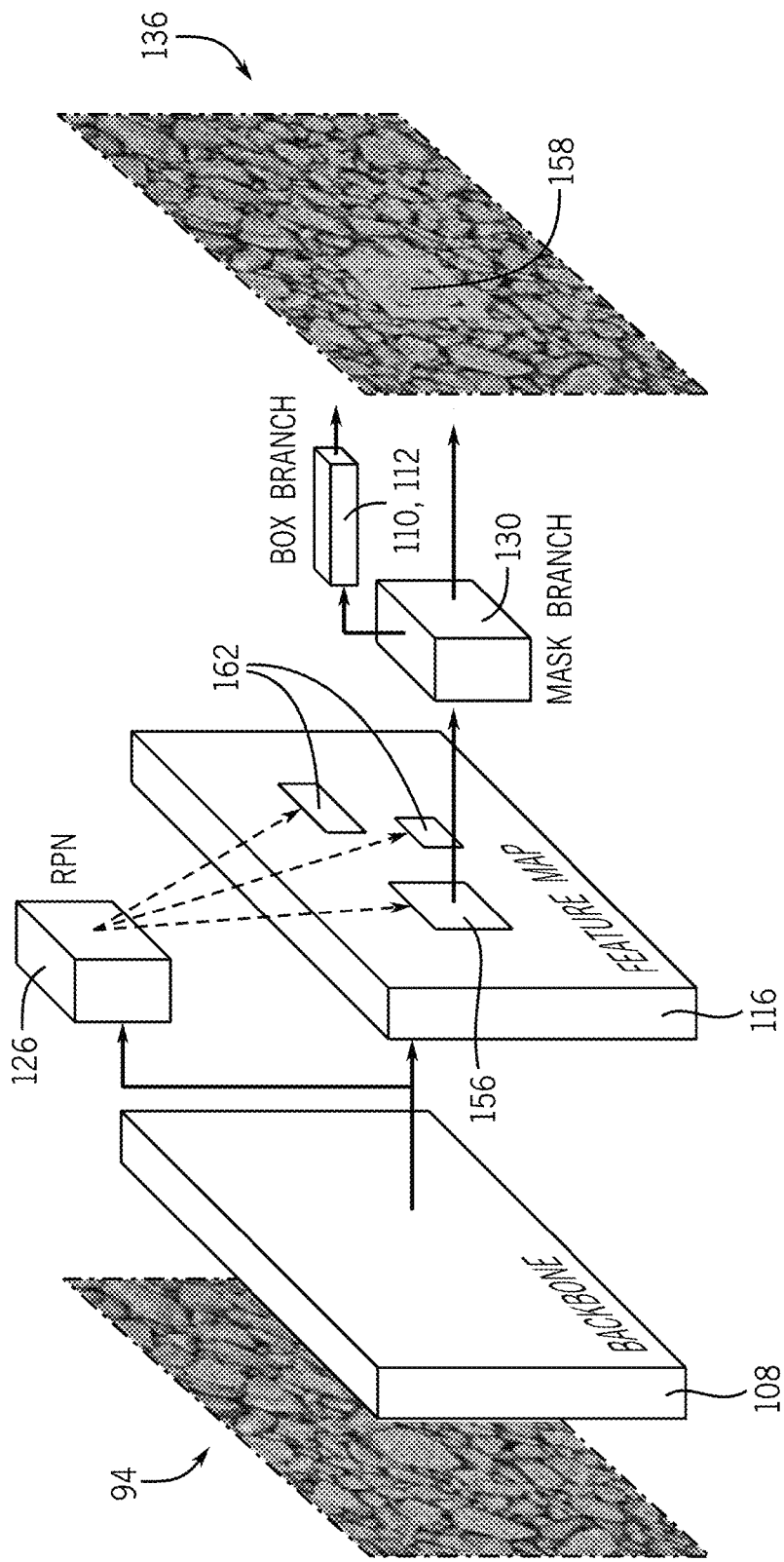
FIG. 14 is another illustration of the building blocks of the embodiments described herein, in accordance with embodiments of the present disclosure.

The mask R-CNN architecture described herein is a general framework for instance segmentation, which was extended from Faster R-CNN, an object detection architecture, as described above. FIG. 14 is another illustration of the building blocks of the embodiments described in greater detail herein. As illustrated, certain embodiments include: (1) a convolutional backbone 108 that generates a feature map 116 that contains semantic information, (2) a Region Proposal Network (RPN) 126 that proposes candidate image regions 156 containing a target object 158, (3) a box and classification branch 110, 112, and (4) a mask branch 130.

As described in greater detail herein, in certain embodiments, the backbone 108 may be based on a Resnet architecture. In addition, in certain embodiments, an implementation integrating a Feature Pyramid Network (FPN) in the backbone 108 that facilitates relatively small object detections by generating multiple feature maps 116 having different scales.

As described in greater detail herein, a Mask R-CNN model may be trained in a supervised manner. In certain embodiments, a training dataset D consists of a set of images 94 and their annotations; $D=\{I_n, B_n\}_{n=1}^N$ where N is the number of images, $I_n \in \mathbb{R}^{H \times W \times 3}$ is the n-th image 94. $B_n = \{x_n^k, y_n^k, h_n^k, w_n^k, c_n^k, M_n^k\}_{k=1}^{K_n}$ is the annotation of the n-th image, where $K_n$ is the number of instances, $x_n^k$, $y_n^k$, $h_n^k$, and $w_n^k$ defines the bounding box center coordinates, height, and width, and $M_n^k \in \{0, 1\}^{H \times W}$ is the binary mask image of the k-th instance. As described in greater detail herein, certain embodiments may only include one class (i.e., rock particles) such that the object class $c_n^k = 1$. The training loss may be defined as the sum of the five losses from RPN 126, the box branch 110, 112, and the mask branch 130. At the inference time, two key outputs may be obtained given an input image I: bounding boxes associated with the confidence score $\{s_{\cdots}^j\}_{j=1}^J$ where $s^j \in (0, 1)$ and J is the detected number of instances, and the mask confidence map $\{S_{\cdots}^j\}_{j=1}^J$ where $S^j \in (0, 1)^{H \times W}$. By applying the threshold $t_{box}$, only relatively high scoring $J_{top}$ boxes are retained. By applying a threshold $t_{mask}$, the binary mask image $\{\hat{M}_{\cdots}^j\}_{j=1}^{J_{top}}$ is obtained, where $\hat{M}^j \in \{0, 1\}^{H \times W}$, and where the obtained binary mask image is used to generate the final resulting image.

As described above, the annotation process, especially the process to produce $M_n^k$, is relatively time consuming and tends to be tedious. As also described herein, to cope with this challenge, photos 94 with sparsely aligned cuttings 46 (see, e.g., the photos 94B illustrated in FIG. 10) may be used to build a training dataset. The relatively sparse alignment greatly facilitates the annotations, as opposed to standard alignment (see, e.g., the photos 94A illustrated in FIG. 10) where the cuttings 46 are naturally placed (e.g., piled, sparse, touching, or some combination) in a single photo 94. In addition, in certain embodiments, a colored tray that provides a relatively vivid background may be used. These settings facilitate easier automation of the segmentation with, for example, a conventional watershed transform, morphological operations, and a color-based thresholding. In certain embodiments, the masks may be manually refined with an annotation tool to build a high-quality dataset. In addition, in certain embodiments, a relatively heavy data augmentation technique may be implemented during training to increase the robustness of the model. In addition, in certain embodiments, various transformations may be used including vertical flip, horizontal flip, RGB noise, contrast change, rotation, resize, and blurring.

In certain embodiments, the inference operation may be expressed as $\{\hat{M}_{\cdots}^j\}_{j=1}^J = f_\theta(I; t_{box}, t_{mask})$, where $f_\theta$ is the model parameterized by $\theta$. In certain embodiments, $t_{mask}$ may be set to 0.5. It has been observed that $t_{box} = 0.5$ provides relatively high quality detections. However, there are cases where some rock particles 46 are not detected. Therefore, in certain embodiments, a TTA technique, which is an aggregation of the model outputs from transformed versions of the input, may be implemented. Typically, data augmentation is performed when a model is being trained, but it can also be used at test-time to obtain greater robustness and improved accuracy. In certain embodiments, this aggregation may be expressed as $\{\hat{M}_i^{J_i} | i \in T\} = \{f(I_i; t_{box}, t_{mask}) | i \in T\}$ and T is a set of flip-based transforms $T = \{\text{defult}, \text{flip}_v, \text{flip}_h, \text{flip}_{vh}\}$ where v and h denote vertical and horizontal, respectively. These transforms are appropriate since the mask branch 130 is rotation-equivariant and the results from transformed images 94 are expected to detect rock particles 46 slightly differently. In many situations, the resulting set of masks contain several overlapping ones. By applying NMS, the most confident instances are preserved in priority, while the overlapping masks are deleted at the same time. This approach increases the number of detections, thereby preserving the detection quality.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In the claims, means-plus-function clauses are intended to cover the structures described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A method, comprising:
   training, via an analysis and control system, a neural network model using a first set of photographs, wherein each photograph of the first set of photographs depicts a first set of objects and include one or more annotations relating to each object of the first set of objects;
   manually arranging a plurality of cuttings in a relatively sparse configuration on a tray having a relatively vivid background color;
   generating a second set of photographs that depict the plurality of cuttings arranged in the relatively sparse configuration on the tray having the relatively vivid background color;
   automatically creating, via the analysis and control system, mask images corresponding to the plurality of cuttings depicted by the second set of photographs;
   enabling, via the analysis and control system, manual fine tuning of the mask images corresponding to the plurality of cuttings depicted by the second set of photographs;
   re-training, via the analysis and control system, the neural network model using the second set of photographs, wherein the re-training is based at least in part on the manual fine tuning of the mask images corresponding to the plurality of cuttings depicted by the second set of photographs; and
   identifying, via the analysis and control system, one or more individual cuttings in a third set of photographs using the re-trained neural network model.

2. The method of claim 1, wherein the first set of objects depicted by the first set of photographs are of a different domain than the plurality of cuttings depicted by the second set of photographs.

3. The method of claim 1, wherein the cuttings depicted by the second and third sets of photographs are generated by a drilling operation.

4. The method of claim 3, comprising:
extracting, via the analysis and control system, morphological, color, and texture data from each individual cutting of the one or more individual cuttings; and
performing, via the analysis and control system, lithological classification of the one or more individual cuttings at a plurality of hierarchical levels based at least in part on the extracted morphological, color, and texture data.

5. The method of claim 4, comprising automatically adjusting, via the analysis and control system, one or more operating parameters of the drilling operation based at least in part on the lithological classification of the one or more individual cuttings.

6. The method of claim 1, wherein identifying, via the analysis and control system, the one or more individual cuttings in the third set of photographs using the re-trained neural network model comprises executing a plurality of inferences on a corresponding plurality of transformed versions of each photograph of the third set of photographs.

7. The method of claim 6, comprising merging the plurality of inferences using non-maximum suppression (NMS) techniques.

8. The method of claim 1, comprising enhancing, via the analysis and control system, the third set of photographs prior to identifying the one or more individual cuttings in the third set of photographs using the re-trained neural network model.

9. The method of claim 1, wherein the neural network model comprises a mask region-based convolutional neural network (Mask R-CNN) model.

10. An analysis and control system configured to:
train a neural network model using a first set of photographs, wherein each photograph of the first set of photographs depicts a first set of objects and include one or more annotations relating to each object of the first set of objects;
generate a second set of photographs that depict a plurality of cuttings manually arranged in a relatively sparse configuration on a tray having a relatively vivid background color;
automatically create mask images corresponding to the plurality of cuttings depicted by a second set of photographs;
enable manual fine tuning of the mask images corresponding to the plurality of cuttings depicted by the second set of photographs;
re-train the neural network model using the second set of photographs, wherein the re-training is based at least in part on the manual fine tuning of the mask images corresponding to the plurality of cuttings depicted by the second set of photographs; and
identify one or more individual cuttings in a third set of photographs using the re-trained neural network model.

11. The analysis and control system of claim 10, wherein the first set of objects depicted by the first set of photographs are of a different domain than the plurality of cuttings depicted by the second set of photographs.

12. The analysis and control system of claim 10, wherein the cuttings depicted by the second and third sets of photographs are a generated by a drilling operation.

13. The analysis and control system of claim 12, wherein the analysis and control system is configured to:
extract morphological, color, and texture data from each individual cutting of the one or more individual cuttings; and
perform lithological classification of the one or more individual cuttings at a plurality of hierarchical levels based at least in part on the extracted morphological, color, and texture data.

14. The analysis and control system of claim 13, wherein the analysis and control system is configured to adjust one or more operating parameters of the drilling operation based at least in part on the lithological classification of the one or more individual cuttings.

15. The analysis and control system of claim 10, wherein identifying the one or more individual cuttings in the third set of photographs using the re-trained neural network model comprises the analysis and control system executing a plurality of inferences on a corresponding plurality of transformed versions of each photograph of the third set of photographs.

16. The analysis and control system of claim 15, wherein the analysis and control system is configured to merge the plurality of inferences using non-maximum suppression (NMS) techniques.

17. The analysis and control system of claim 10, wherein the analysis and control system is configured to enhance the third set of photographs prior to identifying the one or more individual cuttings in the third set of photographs using the re-trained neural network model.

18. The analysis and control system of claim 10, wherein the neural network model comprises a mask region-based convolutional neural network (Mask R-CNN) model.

* * * * *